(12) United States Patent
Mitsubori et al.

(10) Patent No.: US 10,001,204 B2
(45) Date of Patent: Jun. 19, 2018

(54) VIBRATION ISOLATION STRUCTURE OF POWER UNIT INCLUDING TORQUE DAMPERS

(71) Applicant: HONDA MOTOR CO., LTD., Minato-Ku, Tokyo (JP)

(72) Inventors: Toshimasa Mitsubori, Wako (JP); Eisuke Kajihara, Wako (JP); Narumi Kato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 324 days.

(21) Appl. No.: 14/853,383

(22) Filed: Sep. 14, 2015

(65) Prior Publication Data

US 2016/0076634 A1 Mar. 17, 2016

(30) Foreign Application Priority Data

Sep. 16, 2014 (JP) .................................. 2014-187197

(51) Int. Cl.
| | |
|---|---|
| *F16H 3/08* | (2006.01) |
| *F16H 55/14* | (2006.01) |
| *F16H 57/00* | (2012.01) |
| *F16F 15/123* | (2006.01) |
| *B60K 17/08* | (2006.01) |
| *F16H 3/00* | (2006.01) |
| *F16H 37/04* | (2006.01) |

(52) U.S. Cl.
CPC ......... *F16H 57/0006* (2013.01); *B60K 17/08* (2013.01); *F16F 15/123* (2013.01); *B60Y 2200/13* (2013.01); *F16H 3/006* (2013.01); *F16H 37/043* (2013.01)

(58) Field of Classification Search
CPC ........... F16H 55/18; F16D 7/002; F16D 7/044
USPC .................................................. 74/325, 461
See application file for complete search history.

(56) References Cited

U.S. PATENT DOCUMENTS

| | | | | |
|---|---|---|---|---|
| 2,644,439 | A * | 7/1953 | Behringer | B62M 25/00 123/185.6 |
| 4,559,023 | A * | 12/1985 | Uchibaba | F16H 57/0006 464/30 |
| 9,482,309 | B2 * | 11/2016 | Murata | F16F 15/31 |
| 2011/0072924 | A1 * | 3/2011 | Sotani | F16H 55/14 74/411 |

FOREIGN PATENT DOCUMENTS

JP 2003-193854 A 7/2003

* cited by examiner

*Primary Examiner* — Ha Dinh Ho
(74) *Attorney, Agent, or Firm* — Carrier Blackman & Associates, P.C.; William D. Blackman; Joseph P. Carrier

(57) ABSTRACT

A vibration isolation structure of a power unit in which an internal combustion engine is provided with transmissions, including plural transmission gears and a power transmission shaft that pivotally supports the plural transmission gears, and torque dampers are provided between a pair of adjacent transmission gears and the power transmission shaft. The vibration isolation structure can suppress torque fluctuation itself accompanying gearshift and driving reaction force to small fluctuation, and reduce the size of the power unit.

16 Claims, 14 Drawing Sheets

VIBRATION ISOLATION STRUCTURE OF POWER UNIT INCLUDING TORQUE DAMPERS

CROSS-REFERENCE TO RELATED APPLICATIONS

The present invention claims priority under 35 USC 119 based on Japanese patent application No. 2014-187197, filed on Sep. 16, 2014. The entire subject matter of this priority document, including specification claims and drawings thereof, is incorporated by reference herein.

BACKGROUND OF THE INVENTION

1. Field of the Invention

The present invention relates to a vibration isolation structure of a power unit in which an internal combustion engine is integrally provided with a transmission. More specifically the present invention relates to such a vibration isolation structure involving torque dampers of the power unit.

2. Background Art

In a conventional power unit, plural powertrain mechanisms intervene in the process of transmission of rotational power of a crankshaft of an internal combustion engine to an output shaft via a clutch system and a transmission. In general, in the clutch system, a torque damper that buffers torque fluctuation accompanying switching of the clutch is provided for a primary driven gear.

Furthermore, in Japanese Patent Laid-Open No. 2003-193854 (JP 2003-193854) there is disclosed an example including plural torque dampers that buffer torque fluctuation accompanying gearshift of a transmission to intend to suppress the vibration of a power unit as much as possible.

In a structure of (JP 2003-193854), a cam-type damper is provided between the input side of a constant-mesh gear transmission and a clutch output shaft and a torque damper is provided between a countershaft as the output of the transmission and an output shaft of the power unit.

In the conventional power unit including the transmission, large torque fluctuation is caused depending on the timing at which the present shift stage is switched at the time of gearshift and the driving reaction force from the road surface. To buffer this large torque fluctuation, in the structure of (JP 2003-193854), the torque damper is provided on both the input side and output side of the transmission with the intention of suppressing the vibration of the power unit as much as possible.

However, providing the torque damper on each of the input side and output side of the transmission increases the size of the power unit. In addition, when large torque fluctuation is caused in the transmission, a pair of transmission gears of the shift stage to which a driving force is not transmitted act as inertia mass directly. Thus, it is not necessarily easy to suppress the vibration due to the torque fluctuation even when the plural torque dampers are provided.

SUMMARY OF THE INVENTION

The present invention is made in view of such a point and an object thereof is to provide the following described vibration isolation structure of a power unit. Such vibration isolation structure can suppress torque fluctuation itself accompanying gearshift and driving reaction force to a small fluctuation and reduce the size of the power unit. In addition, the vibration isolation structure can reduce the vibration of the power unit accompanying the vibration of transmission gears.

To achieve the above-described object, according to a first aspect of the present invention there is provided a vibration isolation structure of a power unit including an internal combustion engine and transmissions, one of which transmissions has a plurality of transmission gears and a power transmission shaft that pivotally supports the plurality of transmission gears, the vibration isolation structure comprising: torque dampers provided between a pair of transmission gears adjacent to each other and the power transmission shaft in the one transmission. The transmissions include a main transmission and a sub-transmission, and the plurality of transmission gears and the power transmission shaft are in the sub-transmission.

According to a second aspect of the present invention, and in addition to the first aspect, the vibration isolation structure further comprises a gear boss member non-rotatably fitted to the power transmission shaft, the adjacent transmission gears are pivotally supported by the gear boss member relatively rotatably, one of the torque dampers is provided between one of the adjacent transmission gears and the gear boss member, and another of the torque dampers is provided between the other of the adjacent transmission gears and the gear boss member.

According to a third aspect of the present invention, and in addition to the first and second aspects, the gear boss member is composed of a cylindrical boss part non-rotatably fitted to the power transmission shaft and a circular flange part formed at center of the cylindrical boss part in an axial direction thereof, the adjacent transmission gears are disposed on opposite sides of the circular flange part of the gear boss member with the circular flange part therebetween, and are pivotally supported by the cylindrical boss part relatively rotatably, the one torque damper includes a first-side coil spring which is interposed such that the first-side coil spring straddles two spring recesses respectively formed, with openings opposed to each other, in opposed surfaces of the one adjacent transmission gear and the circular flange part of the gear boss member, and the other torque damper includes a second-side coil spring which is interposed such that the second-side coil spring straddles two other spring recesses respectively formed, with openings opposed to each other, in opposed surfaces of the other adjacent transmission gear and the circular flange part of the gear boss member.

According to a fourth aspect of the present invention, and in addition to the first-third aspects, the vibration isolation structure includes more than one said first-side coil spring and more than one said second-side coil spring which are disposed at equal intervals from each other in a circumferential direction of the circular flange part of the gear boss member, the first-side coil springs and the second-side coil springs are alternately disposed in the circumferential direction of the circular flange part, and the first-side coil springs and the second-side coil springs are disposed so as to partly overlap with each other in the axial direction of the cylindrical boss part.

According to a fifth aspect of the present invention, and in addition to the first-fourth aspects, the spring recesses formed in the circular flange part of the gear boss member are through-holes that fully penetrate the circular flange part, guide parts that position the first-side coil springs are formed in the other of the adjacent transmission gears and opposed to the spring recesses of the one of the adjacent transmission gears, and guide parts that position the second-side coil springs are formed in the one of the adjacent transmission gears and opposed to the spring recesses of the other of the adjacent transmission gears.

According to a sixth aspect of the present invention, and in addition to the fourth or fifth aspects, the spring recesses are formed at equal intervals in the circumferential direction in the circular flange part of the gear boss member, and relative rotation restricting mechanisms that restrict relative rotation between the gear boss member and each of the adjacent transmission gears in predetermined ranges are formed between adjacent ones of the spring recesses.

According to a seventh aspect of the present invention, and in addition to the sixth aspect, the relative rotation restricting mechanisms includes loosely fitting relative rotation restricting projections protruding from both of the adjacent transmission gears toward and into the relative rotation restricting recesses notched into an outer circumferential rim of the circular flange part of the gear boss member.

According to an eighth aspect of the present invention, and in addition to the seventh aspect, the one of the adjacent transmission gears has a lower transmission torque and the other of the adjacent transmission gears has a higher transmission torque, and the predetermined range of the relative rotation of the relative rotation restricting mechanism between the one of the adjacent transmission gears and the gear boss member is smaller than that of the relative rotation restricting mechanism between the other of the adjacent transmission gears and the gear boss member.

According to an ninth aspect of the present invention, and in addition to the eighth aspect, the power transmission shaft pivotally supporting the plurality of transmission gears is an output shaft of the power unit used for both forward and reverse traveling.

Effects of the Invention

According to the drive torque damper structure of a power unit in accordance with the first aspect of the present invention, a vibration isolation structure of a power unit including an internal combustion engine and a transmission having a plurality of transmission gears and a power transmission shaft that pivotally supports the plurality of transmission gears is provided, wherein the vibration isolation structure comprises the torque dampers provided between the pair of transmission gears adjacent to each other in the plural transmission gears and the power transmission shaft. Thus, one gear of the pair of adjacent transmission gears meshing with each other is divided into a teeth part side and a shaft part side by the torque dampers formed of separate bodies. Therefore, an inertia mass of the whole transmission becomes smaller and torque fluctuation itself accompanying driving reaction force and gearshift can be suppressed to small fluctuation. Furthermore, the vibration of the power unit can be easily reduced.

Moreover, the torque dampers are provided between the transmission gears and the power transmission shaft and do not need to be provided on the input side and output side of the transmission and so forth. This can reduce the size of the power unit.

According to the drive torque damper structure of a power unit in accordance with the second aspect of the present invention, the gear boss member is non-rotatably fitted to the power transmission shaft, and the transmission gears adjacent to each other are pivotally supported by the gear boss member relatively rotatably. Furthermore, one torque damper is provided between one of the adjacent transmission gears and the gear boss member so as to divide the arrangement into the teeth part side (transmission gear) and the shaft part side (gear boss member). In addition, the other torque damper is provided between the other of the adjacent transmission gears and the gear boss member so as to divide the arrangement into the teeth part side (transmission gear) and the shaft part side (gear boss member). The gear boss member on the shaft part side is used in common to both of the adjacent transmission gears. Thus, the number of components can be reduced and the plural transmission gears can be compactly assembled, which can achieve size reduction of the transmission and the power unit.

According to the drive torque damper structure of a power unit in accordance with the third aspect of the present invention, the gear boss member is composed of the cylindrical boss part non-rotatably fitted to the power transmission shaft and the circular flange part formed at the center of the cylindrical boss part in the axial direction of the cylindrical boss part, while the adjacent transmission gears are disposed on both or opposite sides of the circular flange part of the gear boss member with the intermediary of the circular flange part and are combined with the cylindrical boss part to be pivotally supported by the cylindrical boss part relatively rotatably.

Furthermore, the one torque damper includes a first-side coil spring interposed such that it straddles both of the spring recesses formed, with openings opposed to each other, in opposing surfaces of the one of the adjacent transmission gears and the circular flange part of the gear boss member. In addition, the other torque damper includes a second-side coil spring interposed such that it straddles both of the spring recesses formed, with openings opposed to each other, in opposing surfaces of the other of the adjacent transmission gears and the circular flange part of the gear boss member. Therefore, a dedicated member that positions and holds both of the coil springs is unnecessary and the adjacent transmission gears can be compactly disposed by interposing each of the first-side coil spring and the second-side coil spring on both or opposite sides of the circular flange part of the gear boss member. This can achieve size reduction and simplification of the transmission.

According to the drive torque damper structure of a power unit in accordance with the fourth aspect of the present invention, the vibration isolation structure includes more than one said first-side coil spring and more than one said second-side coil spring which are disposed at equal intervals from each other in a circumferential direction of the circular flange part of the gear boss member Thus, the spring load in the circumferential direction involves no bias and is applied uniformly, whereby it is possible to reduce the pressing frictional force in the radial direction between the gear boss member and the transmission gears.

Furthermore, the first-side coil springs and the second-side coil springs are alternately disposed in the circumferential direction of the circular flange part, and the first-side coil springs and the second-side coil springs are disposed so as to partly overlap with each other in the axial direction of the cylindrical boss part. Therefore, the adjacent transmission gears disposed on both sides of the circular flange part of the gear boss member with the intermediary of the coil springs can be disposed closer to each other. This can suppress a size of the transmission in the axial direction to a small width, which can further reduce the sizes of the transmission and the power unit.

According to the drive torque damper structure of a power unit in accordance with the fifth aspect of the present invention, the spring recesses formed in the circular flange part of the gear boss member are through-holes that fully penetrate the circular flange part, guide parts that position the first-side coil springs are formed in the other of the adjacent transmission gears and opposed to the spring recesses of the one of the adjacent transmission gears, and guide parts that position the second-side coil springs are formed in the one of the adjacent transmission gears and opposed to the spring recesses of the other of the adjacent transmission gears.

Therefore, the first-side coil springs are each held astride a corresponding spring recess on the first side and the spring recess of the gear boss member and are each positioned by the guide part of the other transmission gear. Furthermore, the second-side coil springs are each held astride a corresponding spring recess on the second-side and the spring recess of the gear boss member and are each positioned by the guide part of the one of the adjacent transmission gears. Therefore, the coil springs of both sides are disposed at such positions that substantially half of their bodies overlap with each other in the axial direction and both of the adjacent transmission gears can be brought closer to each other. This can further suppress the size of the transmission in the axial direction of the gear boss member to a smaller width, which can further reduce the sizes of the transmission and the power unit.

According to the drive torque damper structure of a power unit in accordance with the sixth aspect of the present invention, the spring recesses are formed at equal intervals in the circumferential direction of the circular flange part of the gear boss member, and the relative rotation restricting mechanisms that restrict relative rotation between the gear boss member and each of the adjacent transmission gears in predetermined ranges are formed between adjacent ones of the spring recesses. Thus, the relative rotation restricting mechanisms can be formed substantially on a circle concentric with the circle on which the spring recesses are disposed, and their functions can be aggregated on the axial center side, which can achieve further size reduction of the transmission.

According to the drive torque damper structure of a power unit in accordance with the seventh aspect of the present invention, the relative rotation restricting mechanisms are formed by loosely fitting the relative rotation restricting projections protruding from both of the adjacent transmission gears toward and into the respective relative rotation restricting recesses formed by notching at the outer circumferential rim of the circular flange part of the gear boss member. Therefore, a simple, compact relative rotation restricting structure is obtained, and processing molding of the gear boss member and the transmission gears is also easy, which can achieve improvement in manufacturing productivity.

According to the drive torque damper structure of a power unit in accordance with the eighth aspect of the present invention, the one of the adjacent transmission gears has a lower transmission torque and the other of the adjacent transmission gears has a higher transmission torque, and the predetermined range of the relative rotation of the relative rotation restricting mechanism between the one of the adjacent transmission gears and the gear boss member is smaller than that of the relative rotation restricting mechanism between the other of the adjacent transmission gears and the gear boss member. Thus, by restricting the relative rotation accompanying rotation fluctuation of the transmission gear that has the lower transmission torque and rotates at higher speed in the smaller range, the amount of relative rotation at high speed can be reduced and shock can be suppressed as much as possible.

According to the drive torque damper structure of a power unit in accordance with the ninth aspect of the present invention, the power transmission shaft pivotally supporting the plural transmission gears is the output shaft of the power unit used for both forward and reverse traveling. Thus, it is possible to compactly form the structure in which the torque dampers are incorporated into the transmission gears provided on the final output shaft, which is a junction part of the driving force for forward traveling and the driving force for reverse traveling to the drive wheels, and suppress the extension of the structure around the final output shaft of the power unit.

For a more complete understanding of the present invention, the reader is referred to the following, non-limiting, detailed description section, which describes exemplary embodiments of the present invention and should be read in conjunction with the accompanying drawings. Again, such exemplary embodiments are provided for illustration and better understanding of the present invention and are not intended to limit the invention. Throughout the following detailed description and in the drawings, like numbers refer to like parts.

DETAILED DESCRIPTION OF MODES FOR CARRYING OUT THE INVENTION

Figure 1:
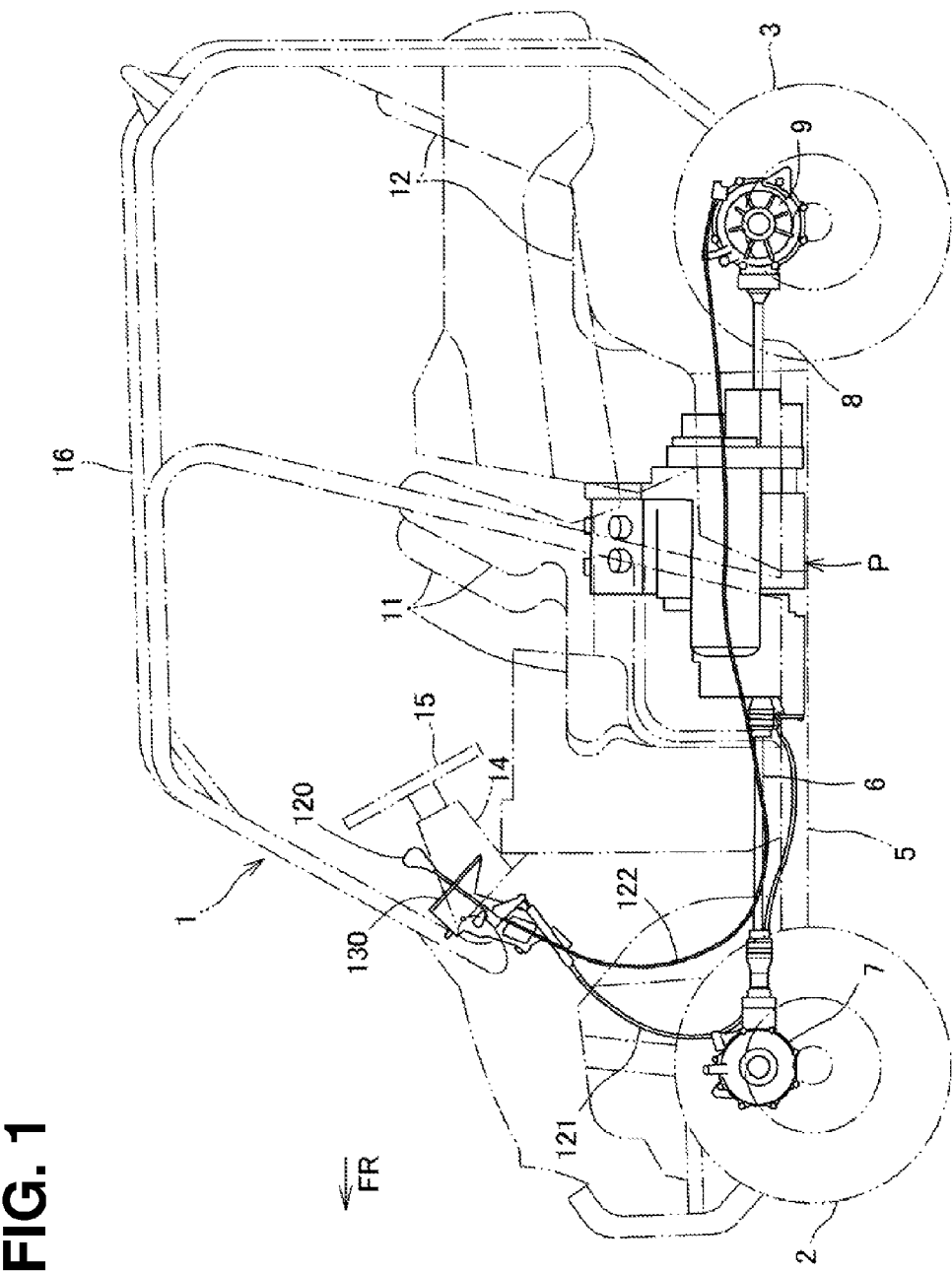
FIG. 1 is a side view of a rough-terrain vehicle in which a power unit according to an exemplary embodiment of the present invention is mounted.

One exemplary embodiment according to the present invention will be described below with reference to FIGS. 1 to 14.

A power unit P according to the present embodiment is mounted in a five-seater, rough-terrain vehicle 1 that allows four-wheel driving and is equipped with a roof. In the description of the present specification, the front, rear, left, and right directions conform to a normal basis in which the straight forward direction of the rough-terrain vehicle 1 according to the present embodiment is defined as the front direction. In the drawings, arrows FR, LH, and RH indicate the vehicle front side, the vehicle left side, and the vehicle right side, respectively.

Referring to FIG. 1, in the rough-terrain vehicle 1, a pair of left and right front wheels 2 and a pair of left and right rear wheels 3 to which low-pressure balloon tires for rough terrain are mounted are suspended on the front and rear sides of a vehicle body frame 5.

The power unit P is mounted at a central position in the vehicle body frame 5 in the front-rear direction, with a crankshaft 21 of an internal combustion engine E oriented along the front-rear direction. An output shaft (gearshift driven shaft) 51 of the power unit P protrudes forward and rearward. Rotational power of the output shaft 51 is transmitted from the front end of the output shaft 51 to the left and right front wheels 2 via a front drive shaft 6 and a front differential 7 and is transmitted from the rear end to the left and right rear wheels 3 via a rear drive shaft 8 and a rear differential 9. Differential lock mechanisms (not shown) are added to the front differential 7 and the rear differential 9, and a clutch that connects and disconnects power transmission to the front wheels and makes switching between two-wheel driving and four-wheel driving is incorporated in the front differential 7.

Three front seats 11 are lined in the left-right direction above the power unit P and two rear seats 12 are disposed as left and right seats at the rear part of the vehicle body frame 5. The center seat among the front seats 11 is a driver's seat and is located slightly closer to the front side than the left and right seats. A steering handle 15 protruding from a steering column 14 is provided on the front side of this driver's seat. A parking operation lever 120 is disposed in an operation panel 130 near the steering column 14. A roof 16 covers the upper side of the front seats 11 and the rear seats 12.

In the power unit P mounted in this rough-terrain vehicle 1, a power train system 20 is formed by combining a main transmission Tm and a sub-transmission Ts with the internal combustion engine E as a straight-two-cylinder, water-cooled, four-stroke engine. The power unit P is mounted on the vehicle body frame 5 with a so-called longitudinal posture in which the crankshaft 21 of the internal combustion engine E is oriented along the vehicle body front-rear direction.

As shown in FIG. 1, a shift cable 121 and a parking cable 122 extend from the parking operation lever 120. The shift cable 121 is linked to the tip of a shift actuation lever 100 whose base end is fitted to a shift spindle 101 protruding to the front side of the sub-transmission Ts (see FIGS. 2-3). On the other hand, the parking cable 122 extends to the vehicle body rear side and is linked to the actuation part of the differential lock mechanism added to the rear differential 9.

Figure 2:
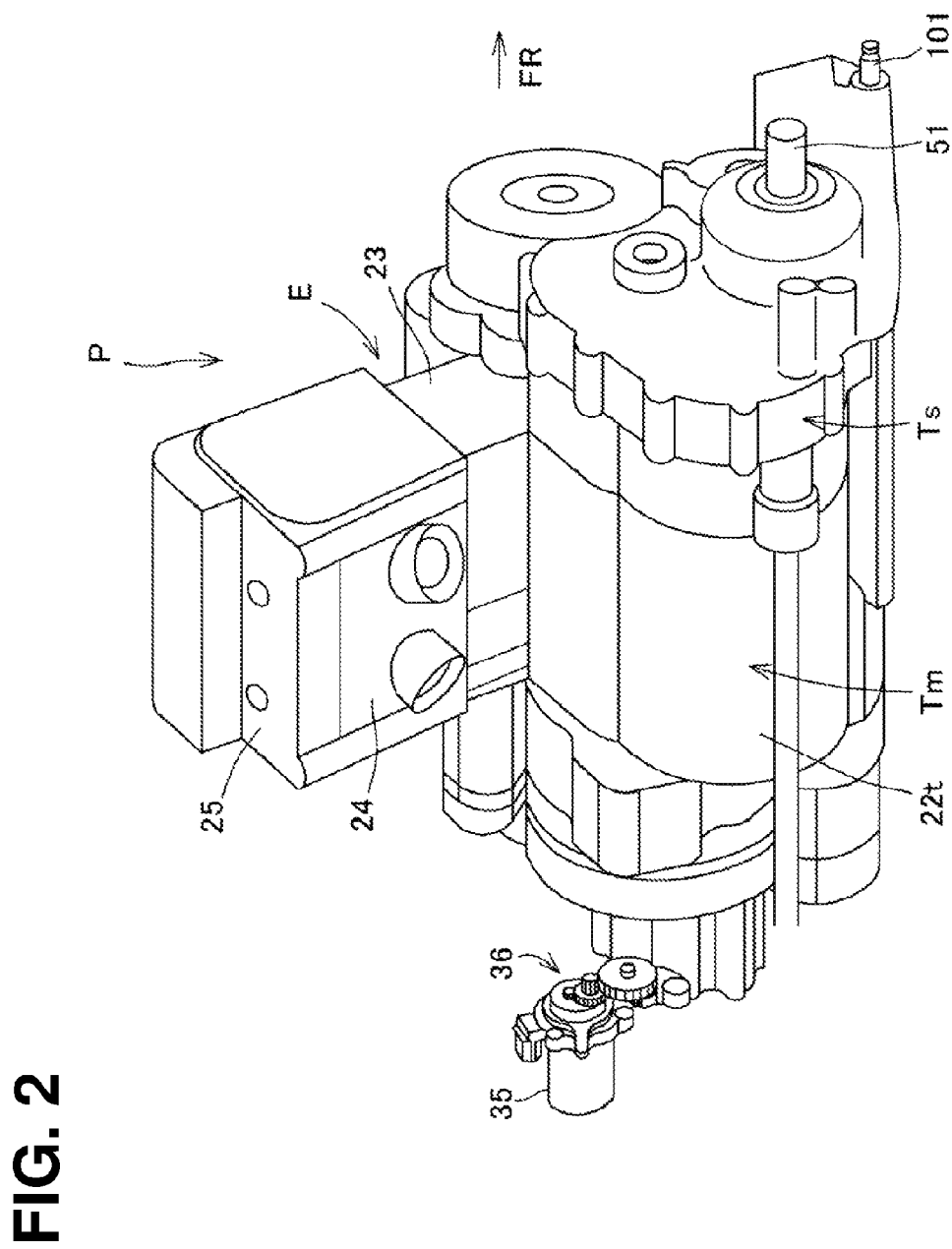
FIG. 2 is an overall perspective view of the power unit of FIG. 1.
Figure 3:
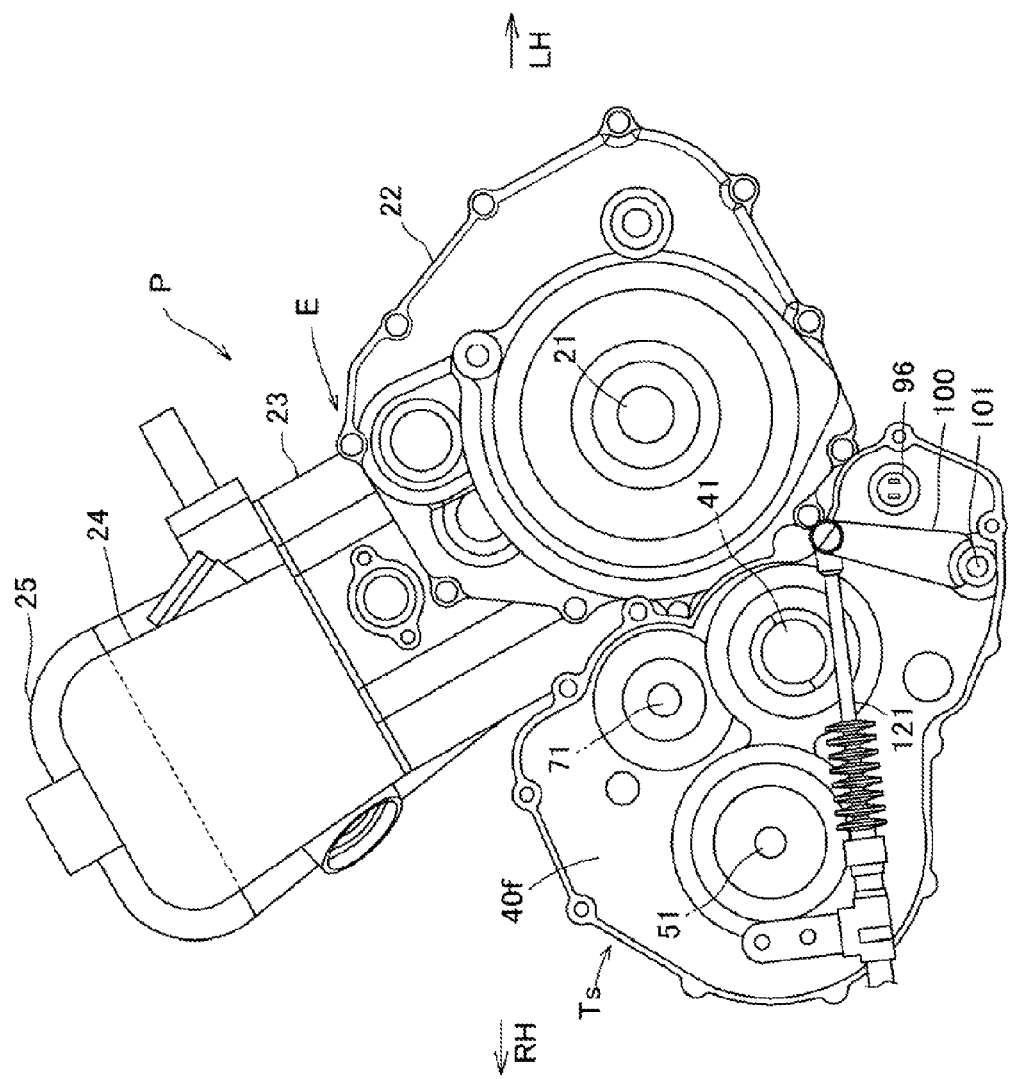
FIG. 3 is a front view of the power unit of FIG. 1.

Referring to FIGS. 2 and 3, in the power unit P, a cylinder block 23, a cylinder head 24, and a cylinder head cover 25 are sequentially overlapped to protrude obliquely toward the right upper side of a crankcase 22 that pivotally supports the crankshaft 21 of the internal combustion engine E. The crankcase 22 bulges to the right side and forms a main transmission case 22t to house the main transmission Tm. This main transmission Tm is located on the right side of the crankshaft 21 of the internal combustion engine E and the sub-transmission Ts is provided in a protruding manner to substantially overlap with the front side of the main transmission Tm.

Figure 5:
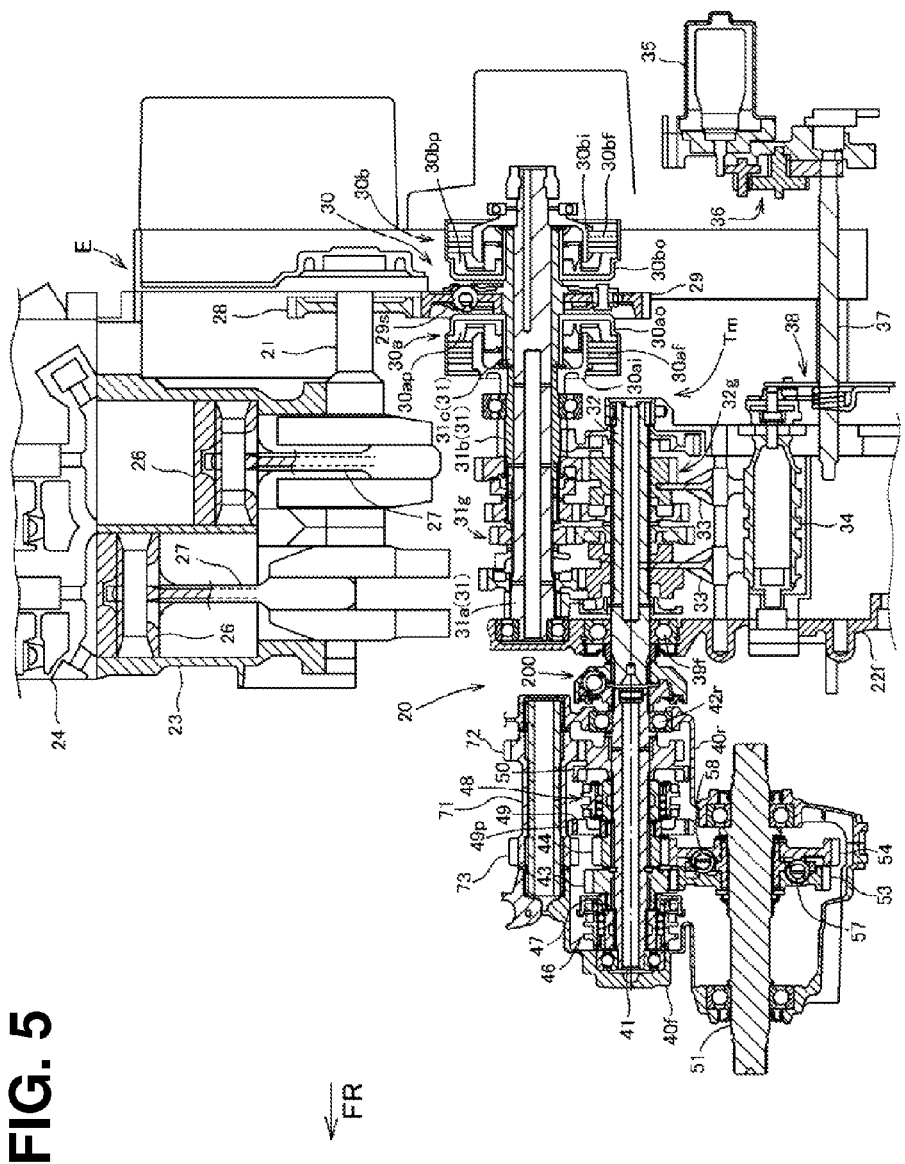
FIG. 5 is a sectional view of a powertrain system showing the whole of a powertrain of the power unit of FIG. 1.

The whole of the power train system 20 is shown in FIG. 5 as a sectional view.

In the cylinder block 23 of the internal combustion engine E, two cylinders are formed to be lined in the front-rear direction in a straight manner Connecting rods 27 join pistons 26 that slide in a reciprocating manner in the respective cylinder bores to the crankshaft 21 and the reciprocation of the pistons 26 is converted to the rotation of the crankshaft 21 to be output. A primary drive gear 28 is fitted to the rear end part of the crankshaft 21 oriented along the front-rear direction.

A main shaft 31 of the main transmission Tm located on the right side of the crankshaft 21 is formed by rotatably fitting a main shaft outer cylinder 31b and a clutch part outer cylinder 31c lined in the front-rear direction to the outer circumference of a main shaft inner cylinder 31a as a long component. Six drive transmission gears 31g are provided on the main shaft 31. Corresponding to the drive transmission gears 31g, six driven transmission gears 32g that constantly mesh with them are provided on a countershaft 32. The drive transmission gears 31g of odd shift stages are provided on the main shaft inner cylinder 31a and the drive transmission gears 31g of even shift stages are provided on the main shaft outer cylinder 31b.

A twin clutch 30 composed of a first clutch 30a and a second clutch 30b is formed on the clutch part outer cylinder 31c. A primary driven gear 29 is splined to the center of the clutch part outer cylinder 31c and clutch outers 30ao and 30bo of the first clutch 30a and the second clutch 30b are splined to both sides of the primary driven gear 29 with restriction of movement in the axial direction.

The primary driven gear 29 at the center meshes with the primary drive gear 28 provided on the crankshaft 21. A clutch damper spring 29s is interposed between the primary driven gear 29 and a central flange part of the clutch part outer cylinder 31c and buffers torque fluctuation between the primary driven gear 29 and the clutch part outer cylinder 31c.

A clutch inner 30ai of the first clutch 30a is splined to the main shaft inner cylinder 31a with restriction of movement in the axial direction, and a clutch inner 30bi of the second clutch 30b is splined to the main shaft outer cylinder 31b with restriction of movement in the axial direction. A pressurizing plate 30ap (30bp) can pressurize a friction plate group 30af (30bf) in which drive friction plates that rotate together on the side of the clutch outer 30ao (30bo) and driven friction plates that rotate together on the side of the clutch inner 30ai (30bi) are alternately arranged.

A hydraulic circuit that selectively drives the pressurizing plates 30ap and 30bp is formed in the main shaft inner cylinder 31a, the clutch part outer cylinder 31c, and a rear crankcase cover. When the pressurizing plate 30ap is driven and the friction plate group 30af is pressurized, the first clutch 30a is connected and power input to the primary driven gear 29 is transmitted to the main shaft inner cylinder 31a, so that the drive transmission gears 31g of the odd shift stages rotate. On the other hand, when the pressurizing plate 30bp is driven and the friction plate group 30bf is pressurized, the second clutch 30b is connected and power input to the primary driven gear 29 is transmitted to the main shaft outer cylinder 31b, so that the drive transmission gears 31g of the even shift stages rotate.

Two of the six drive transmission gears 31g pivotally supported by the main shaft 31 are shifter gears that slide in the axial direction and two of the six driven transmission gears 32g pivotally supported by the countershaft 32 are shifter gears that slide in the axial direction. Shift forks 33 that move the two shifter gears on the countershaft 32 are provided to be supported by a shift fork shaft 33a. Shift forks 33 that move the two shifter gears on the main shaft 31 and a shift fork shaft for them are also provided although not shown in the diagram.

The four shift forks 33 move by being guided by guide grooves formed in the outer circumferential surface of a shift drum 34 through the rotation of the shift drum 34, and switch the meshing of the gears to which power is transmitted effectively. The shift drum 34 rotates by a gearshift motor 35. The driving force of the gearshift motor 35 is transmitted for the rotation of a shift spindle 37 via a reduction gear mechanism 36 and the rotation of the shift spindle 37 is transmitted for the rotation of the shift drum 34 via an intermittent feed mechanism 38.

Therefore, the main transmission Tm can smoothly make switching among shift stages from first to sixth and shift gears by hydraulic control of the twin clutch 30 and driving control of the gearshift motor 35. The output shaft of the main transmission Tm is the countershaft 32 and the countershaft 32 penetrates a front wall 22f of the crankcase 22 and protrudes forward.

Figure 4:
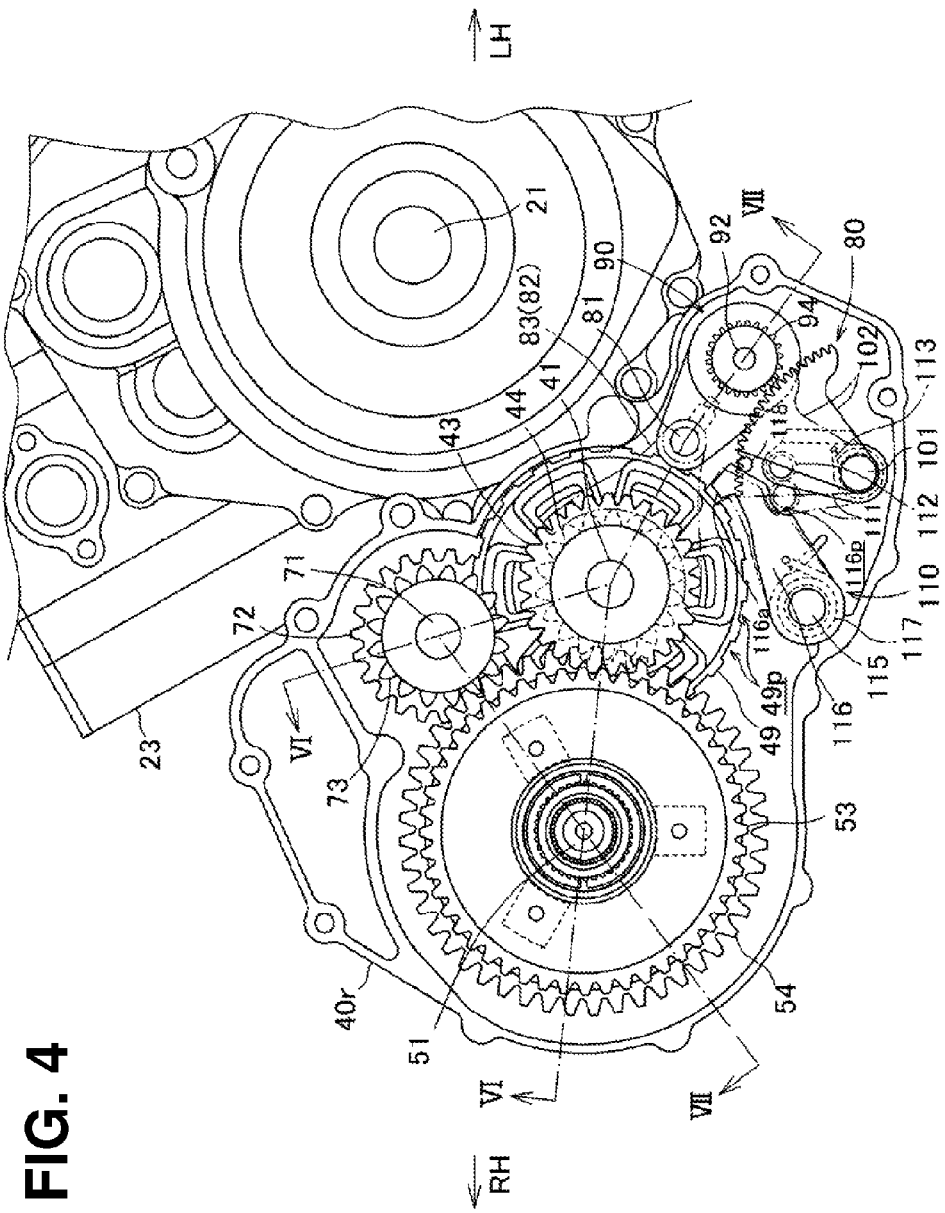
FIG. 4 is a front view of a sub-transmission of the power unit of FIG. 1 from which a front sub-transmission case is removed.

In the power unit P, the sub-transmission Ts is provided on the front side of this main transmission Tm. In the sub-transmission Ts, a front sub-transmission case 40f and a rear sub-transmission case 40r made as front-rear split components are united with each other and are constituted inside. As shown in FIG. 4, which is a front view of a state in which the front sub-transmission case 40f of the sub-transmission Ts is removed, a gearshift drive shaft 41 and the gearshift driven shaft 51 that mesh transmission gears with each other in the sub-transmission Ts are disposed to be lined in the left-right direction and an intermediate gear shaft 71 is disposed at a position corresponding to a corner of a triangle on the obliquely upper side of each of the gearshift drive shaft 41 and the gearshift driven shaft 51.

Figure 6:
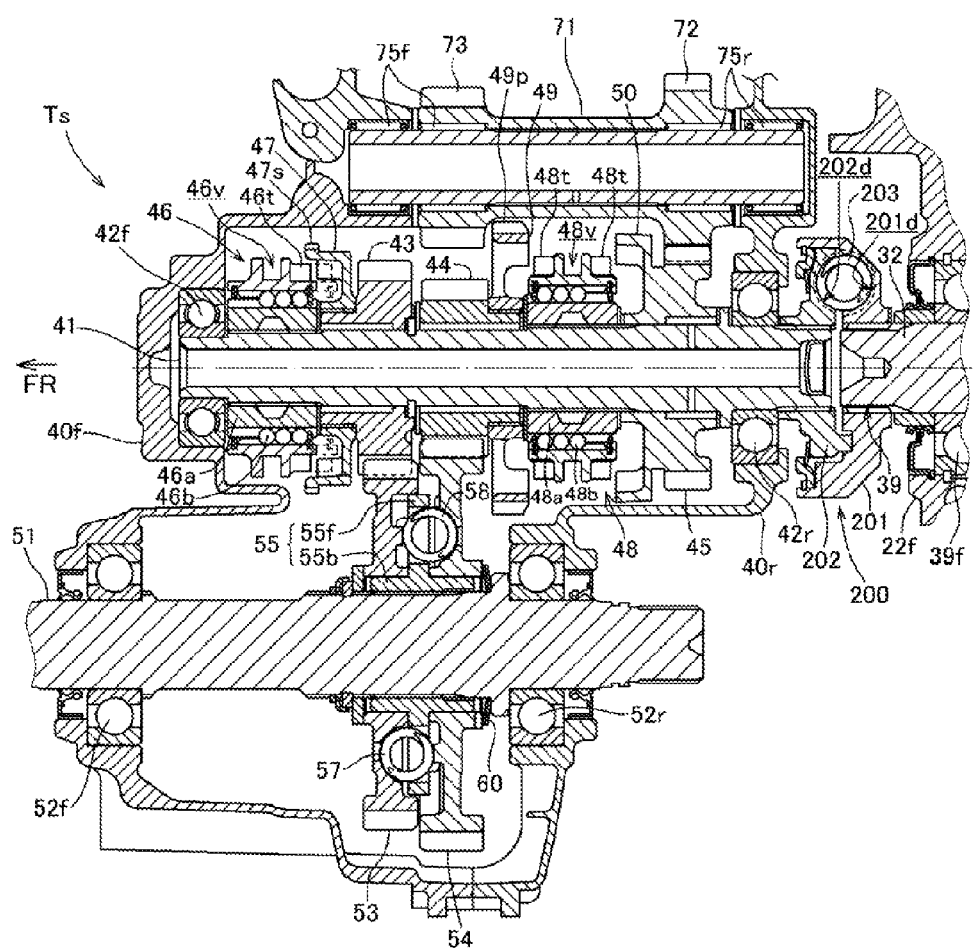
FIG. 6 is a sectional view of the sub-transmission (sectional view along line VI-VI in FIG. 4).
Figure 7:
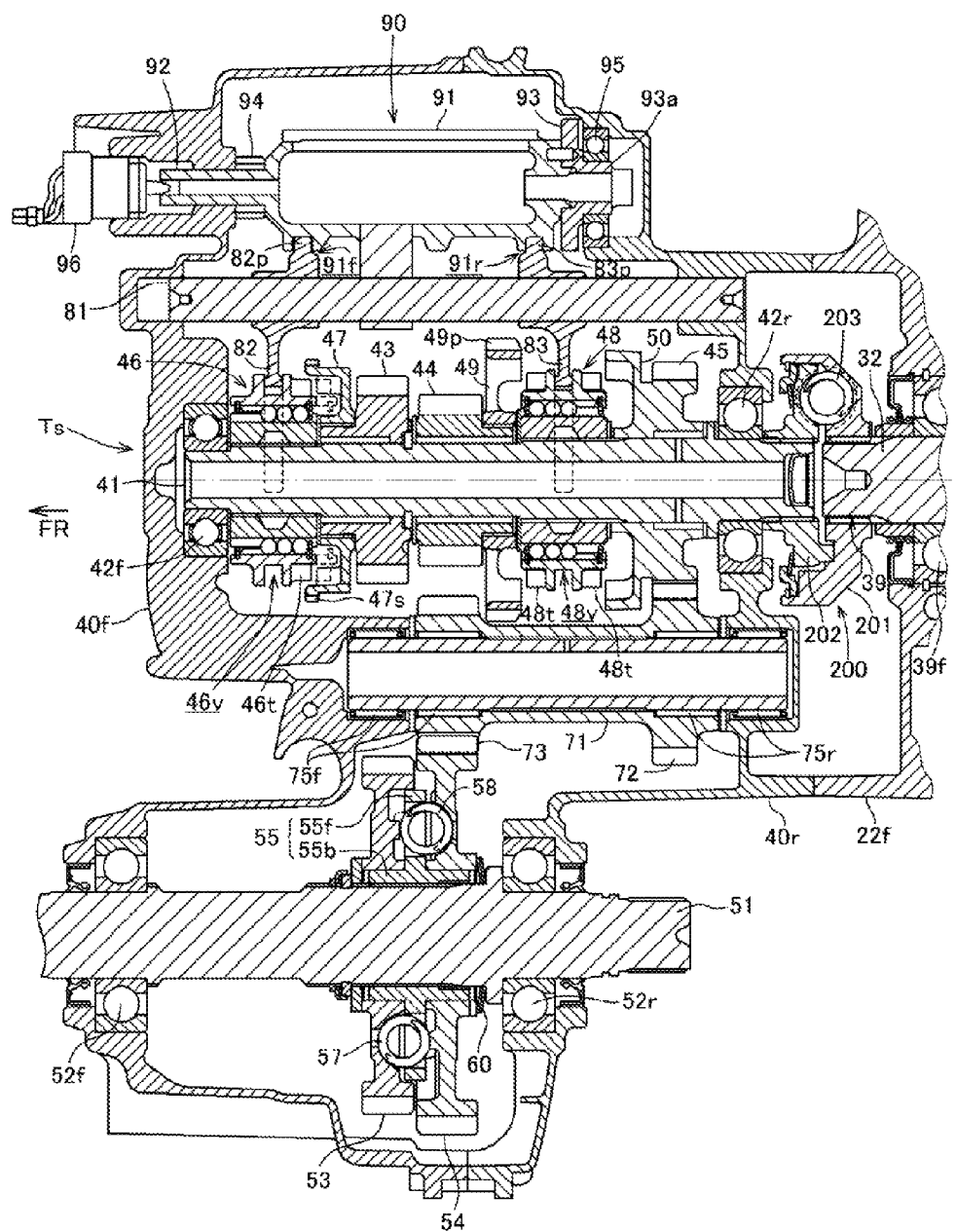
FIG. 7 is a sectional view of the sub-transmission (sectional view along line VII-VII in FIG. 4).

Referring to FIGS. 6 and 7 as sectional views of the sub-transmission Ts, the gearshift drive shaft 41, the gearshift driven shaft 51, and the intermediate gear shaft 71 of the sub-transmission Ts are oriented along the front-rear direction in parallel to the crankshaft 21, and are each suspended, with the front and rear ends pivotally supported by the front sub-transmission case 40f and the rear sub-transmission case 40r.

The gearshift drive shaft 41 is rotatably suspended, with the front end pivotally supported by a bearing 42f fitted into a bearing recess of the front sub-transmission case 40f and with the rear end pivotally supported by a bearing 42r fitted into a bearing hole of the rear sub-transmission case 40r. The gearshift drive shaft 41 penetrates the bearing 42r and protrudes rearward from the rear sub-transmission case 40r.

Meanwhile, the countershaft 32 that is pivotally supported by a bearing 39f and penetrates the front wall 22f of the crankcase 22 of the main transmission Tm forward to protrude forward is located on the rear side of the gearshift drive shaft 41 coaxially, with end surfaces opposed to each other. A joining torque damper 200 is interposed between the countershaft 32 and the gearshift drive shaft 41, which are coaxially disposed (see FIG. 5).

Referring to FIGS. 6 and 7, the joining torque damper 200 is formed as follows. A drive-side damper half body 201 splined to the front shaft end part of the countershaft 32 and a driven-side damper half body 202 splined to the rear shaft end part of the gearshift drive shaft 41 are disposed opposed to each other. Furthermore, a coil spring 203 is set to straddle both a drive-side spring recess 201d and a driven-side spring recess 202d that each have a semicircular column shape and are formed in the surfaces opposed to each other in the drive-side damper half body 201 and the driven-side damper half body 202, with their openings opposed to each other.

Therefore, the rotation of the countershaft 32, which is a drive shaft from the viewpoint of the joining torque damper 200, is transmitted to the gearshift drive shaft 41 as a driven shaft via the joining torque damper 200, and the coil spring 203 of the joining torque damper 200 buffers torque fluctuation between them.

Referring to FIGS. 6 and 7, on the gearshift drive shaft 41, a high-speed drive gear 43 and a low-speed drive gear 44 are lined in the front-rear direction and are rotatably supported at a center part and a reverse drive gear 45 is rotatably supported at a rear part. Furthermore, the gearshift drive shaft 41 is provided with a high-speed switching clutch mechanism based on a high-speed switching shifter member 46 between the bearing 42f at the front end and the high-speed drive gear 43. The high-speed switching shifter member 46 is supported movably in the axial direction by the outer circumference of a cylindrical base part 46a splined to a predetermined position on the gearshift drive shaft 41 in the axial direction with the intermediary of a linear-motion bearing 46b. A shift fork groove 46v is formed into a ring shape at the center of the high-speed switching shifter member 46 and a clutch tooth 46t is formed toward the rear side relative to the shift fork groove 46v.

A high-speed gearshift clutch receiving member 47 is provided to be opposed to this clutch tooth 46t and be fitted to the high-speed drive gear 43. Therefore, when the high-speed switching shifter member 46 moves rearward, the clutch tooth 46t meshes with the high-speed gearshift clutch receiving member 47 fitted to the high-speed drive gear 43 and rotates the high-speed drive gear 43 with the gearshift drive shaft 41. When the high-speed switching shifter member 46 exists on the front side, power is not transmitted to the high-speed drive gear 43. Plural protruding streaks 47s are formed at equal intervals on the outer circumferential surface of the high-speed gearshift clutch receiving member 47 and a speed sensor (not shown) senses the protruding streaks 47s to detect the vehicle speed.

On the other hand, on the gearshift drive shaft 41, a low-speed/reverse switching clutch mechanism based on a low-speed/reverse switching shifter member 48 is provided between the low-speed drive gear 44 and the reverse drive gear 45. The low-speed/reverse switching shifter member 48 is supported movably in the axial direction by the outer circumference of a cylindrical base part 48a splined to a predetermined position on the gearshift drive shaft 41 in the axial direction with the intermediary of a linear-motion bearing 48b. A shift fork groove 48v is formed between clutch teeth 48t formed toward both the front and rear sides.

A low-speed gearshift clutch receiving member 49 is provided to be opposed to the front clutch tooth 48t of the low-speed/reverse switching shifter member 48 and be fitted to the low-speed drive gear 44. A reverse clutch receiving member 50 is provided to be opposed to the rear clutch tooth 48t and be fitted to the reverse drive gear 45.

Therefore, when the low-speed/reverse switching shifter member 48 moves forward, the front clutch tooth 48t meshes with the low-speed gearshift clutch receiving member 49 fitted to the low-speed drive gear 44 and rotates the low-speed drive gear 44 with the gearshift drive shaft 41. When the low-speed/reverse switching shifter member 48 moves rearward, the rear clutch tooth 48*t* meshes with the reverse clutch receiving member 50 fitted to the reverse drive gear 45 and rotates the reverse drive gear 45 with the gearshift drive shaft 41.

When the low-speed/reverse switching shifter member 48 is located at a central position between the low-speed gearshift clutch receiving member 49 and the reverse clutch receiving member 50 and meshes with neither, the rotation of the gearshift drive shaft 41 is transmitted to neither the low-speed drive gear 44 nor the reverse drive gear 45. Plural locking grooves 49*p* for parking are formed in the circumferential direction in the outer circumferential surface of the low-speed gearshift clutch receiving member 49 and are used for parking stop.

In the gearshift driven shaft 51 disposed on the right side of the gearshift drive shaft 41 in parallel, the front part penetrates a bearing 52*f* fitted into a bearing hole of the front sub-transmission case 40*f* and is pivotally supported and the rear part penetrates a bearing 52*r* fitted into a bearing hole of the rear sub-transmission case 40*r* and is pivotally supported. Thus, the gearshift driven shaft 51 is rotatably suspended, with the front and rear ends protruded forward and rearward. The gearshift driven shaft 51, which is a powertrain shaft, is the output shaft 51 of the sub-transmission Ts and also the output shaft 51 of the power unit P.

On this gearshift driven shaft 51, a high-speed driven gear 53 and a low-speed driven gear 54 that constantly mesh with the high-speed drive gear 43 and the low-speed drive gear 44, respectively, pivotally supported by the gearshift drive shaft 41 are pivotally supported (see FIG. 6). A gear boss member 55 that is fitted to the gearshift driven shaft 51 and is prohibited from rotating relative to the gearshift driven shaft 51 pivotally supports the high-speed driven gear 53 and the low-speed driven gear 54, with each of these gears allowed to rotate relative to the gear boss member 55.

The gear boss member 55 is composed of a cylindrical boss part 55*b* that is fitted to the gearshift driven shaft 51 and is prohibited from rotating relative to the gearshift driven shaft 51 and a circular flange part 55*f* formed at the center of the cylindrical boss part 55*b* in the axial direction. The high-speed driven gear 53 and the low-speed driven gear 54 adjacent to each other are disposed at front and rear positions between which the circular flange part 55*f* of the gear boss member 55 is interposed, and are each pivotally supported by the cylindrical boss part 55*b* extending to the front and rear sides of the circular flange part 55*f* rotatably relative to the cylindrical boss part 55*b*. The high-speed driven gear 53 and the low-speed driven gear 54 are biased in the axial direction by a coned disc spring 60, with the gear boss member 55 interposed between them.

A high-speed-side (or first-side) coil spring is interposed between the high-speed driven gear 53 on the front side and the circular flange part 55*f* of the gear boss member 55, and a low-speed-side (or second-side) coil spring 58 is interposed between the low-speed driven gear 54 on the rear side and the circular flange part 55*f* of the gear boss member 55.

Therefore, the rotation of the high-speed driven gear 53 is transmitted to the gear boss member 55 and the gearshift driven shaft 51 via the high-speed-side coil spring 57, and the high-speed-side coil spring 57 buffers torque fluctuation between the high-speed driven gear 53 and the gear boss member 55. Similarly, the rotation of the low-speed driven gear 54 is transmitted to the gear boss member 55 and the gearshift driven shaft 51 via the low-speed-side coil spring 58, and the low-speed-side coil spring 58 buffers torque fluctuation between the low-speed driven gear 54 and the gear boss member 55. Details of the torque damper formed by the high-speed-side coil spring 57 and the low-speed-side coil spring 58 will be described later.

Referring to FIG. 6, the intermediate gear shaft 71 located on the obliquely upper side of each of the gearshift drive shaft 41 and the gearshift driven shaft 51 is rotatably suspended, with the front end pivotally supported by a front-rear dual-type bearing 75*f* fitted into a bearing recess of the front sub-transmission case 40*f* and with the rear end pivotally supported by a front-rear dual-type bearing 75*r* fitted into a bearing recess of the rear sub-transmission case 40*r* (see FIGS. 6 and 7).

On the intermediate gear shaft 71, a larger-diameter intermediate gear 72 is formed at the rear part and a smaller-diameter intermediate gear 73 is formed at the front part. The larger-diameter intermediate gear 72 on the rear side meshes with the reverse drive gear 45 rotatably supported by the gearshift drive shaft 41 (see FIG. 6) and the smaller-diameter intermediate gear 73 on the front side meshes with the low-speed driven gear 54 rotatably supported by the gearshift driven shaft 51 (see FIG. 7).

A gearshift drive mechanism 80 that moves the high-speed switching shifter member 46 and the low-speed/reverse switching shifter member 48 on the gearshift drive shaft 41 in the axial direction is provided on the left side (right side, in FIG. 4) of the gearshift drive shaft 41, i.e. on the lower side of the crankshaft 21.

A shift fork shaft 81 penetrates a shift fork 82 fitted into the shift fork groove 46*v* of the high-speed switching shifter member 46 and a shift fork 83 fitted into the shift fork groove 48*v* of the low-speed/reverse switching shifter member 48, and pivotally supports the shift forks 82 and 83 slidably in the axial direction. The shift fork shaft 81 is suspended at a position on the obliquely left lower side of the gearshift drive shaft 41, with the front and rear ends supported by the front sub-transmission case 40*f* and the rear sub-transmission case 40*r* (see FIGS. 4 and 7).

A shift drum 90 is provided on the obliquely left lower side of the shift fork shaft 81 (see FIG. 4). Referring to FIG. 7, in the shift drum 90, a drum support shaft 92 protrudes toward the front side from the front end of a drum main body 91 having a cylindrical shape and penetrates the front sub-transmission case 40*f* to be rotatably supported. A star-shaped cam 93 is fastened to the rear end of the drum main body 91 and a center shaft 93*a* protruding to the rear side of the star-shaped cam 93 is pivotally supported by a bearing recess of the rear sub-transmission case 40*r* with the intermediary of a bearing 95.

A shift drum input gear 94 is fitted to the drum support shaft 92 protruding to the front side of the shift drum 90 along the inner surface of the front sub-transmission case 40*f*. The front end of the drum support shaft 92 penetrating the front sub-transmission case 40*f* and protruding is joined to a drive shaft of a shift position sensor 96 coaxially. The rotational angle of the shift drum 90 is detected by the shift position sensor 96.

In the outer circumferential surface of the drum main body 91, guide grooves 91*f* and 91*r* are formed along the circumferential direction at front and rear positions with requisite shapes. Engagement pin parts 82*p* and 83*p* formed to protrude in the shift forks 82 and 83 slidably engage with the guide grooves 91*f* and 91*r*. By the rotation of the shift drum 90, the shift forks 82 and 83 are guided by the guide grooves 91*f* and 91*r*, respectively, to move in the axial direction. This moves the high-speed switching shifter member 46 and the low-speed/reverse switching shifter member 48 to perform gearshift.

Referring to FIG. 4, the shift spindle 101 is suspended below the shift fork shaft 81, with the front and rear ends rotatably supported by the front sub-transmission case 40f and the rear sub-transmission case 40r. The base end of the shift actuation lever 100 is fitted to the front end of the shift spindle 101 penetrating the front sub-transmission case 40f and protruding forward (FIG. 3). A gear shift arm 102 having a sector form is fitted to the shift spindle 101 at a predetermined position and meshes with the shift drum input gear 94 fitted to the drum support shaft 92 protruding to the front side of the shift drum 90.

Furthermore, a parking actuation arm 111 is pivotally supported swingably on the shift spindle 101 on the rear side of the gear shift arm 102. A torsion spring 113 is interposed between the shift spindle 101 and the parking actuation arm 111 and the rotation of the shift spindle 101 is transmitted for the swing of the parking actuation arm 111 via the torsion spring 113. A roller 112 is rotatably supported at the tip of the parking actuation arm 111 (see FIG. 4).

Referring to FIG. 4, a lever support shaft 115 oriented along the front-rear direction is suspended on the right side of the shift spindle 101 and on the lower side of the gearshift drive shaft 41, with the front and rear ends supported by the front sub-transmission case 40f and the rear sub-transmission case 40r. A parking locking lever 116 whose base end is pivotally supported by the lever support shaft 115 is swingably provided.

Referring to FIG. 4, which is a front view, the parking locking lever 116 exists at the same position as the low-speed gearshift clutch receiving member 49 pivotally supported by the gearshift drive shaft 41 in the front-rear axial direction, and is provided to extend from the base end part pivotally supported by the lever support shaft 115 toward the obliquely upper side between the low-speed gearshift clutch receiving member 49 and the parking actuation arm 111. The plural locking grooves 49p for parking are formed in the circumferential direction in the outer circumferential surface of the low-speed gearshift clutch receiving member 49.

The parking locking lever 116 is biased in a clockwise direction in front view by a torsion spring 117 wound around the lever support shaft 115. The tip of the parking locking lever 116 is in contact with a stopper 118 provided to protrude from the rear sub-transmission case 40r at a predetermined position and thereby the swing of the parking locking lever 116 is restricted. In the parking locking lever 116, a locking protrusion 116a is formed to protrude in the side facing the outer circumferential surface of the low-speed gearshift clutch receiving member 49. Furthermore, in the side that is on the opposite side and faces the parking actuation arm 111, a concave surface 116p for parking is formed in an inclined surface with which the roller 112 at the tip of the parking actuation arm 111 gets contact (see FIG. 4).

A parking drive mechanism 110 is formed by the parking actuation arm 111, the parking locking lever 116, and the locking grooves 49p for parking in the low-speed gearshift clutch receiving member 49. FIG. 4 shows a state in which the sub-transmission Ts is in the neutral state. The parking locking lever 116 biased by the torsion spring 117 is in contact with the stopper 118 and is located separately from the outer circumferential surface of the low-speed gearshift clutch receiving member 49.

Referring to FIG. 4, when the shift spindle 101 rotates in an anticlockwise direction and the parking actuation arm 111 swings to the right side (left side, in FIG. 4) and the roller 112 at the tip of the parking actuation arm 111 abuts against the inclined surface of the parking locking lever 116 and rolls, the parking locking lever 116 is swung obliquely upward and the locking protrusion 116a of the parking locking lever 116 is pressed against the outer circumferential surface of the low-speed gearshift clutch receiving member 49 to engage with the locking grooves 49p for parking. This causes the parking locking lever 116 to restrict the rotation of the low-speed gearshift clutch receiving member 49. A state shown by a two-dot chain line in FIG. 4 shows this parking state in which the rotation of the low-speed gearshift clutch receiving member 49 is prohibited.

Specifically, referring to FIG. 6, when the rotation of the low-speed gearshift clutch receiving member 49 is restricted, the rotation of both the low-speed gearshift clutch receiving member 49 and the low-speed drive gear 44 integrated with it is restricted and the rotation of the low-speed driven gear 54, which meshes with the low-speed drive gear 44, is restricted. Thus, the rotation of the gearshift driven shaft (output shaft) 51, which moves in association with the low-speed driven gear 54 with the intermediary of the coil spring 58, is restricted, so that the vehicle enters the parking state. Because the rotation of the gearshift driven shaft (output shaft) 51 is restricted through the meshing between the low-speed drive gear 44 and the low-speed driven gear 54 having a high change gear ratio, the rotation of the gearshift driven shaft (output shaft) 51 can be restricted by a comparatively-large force at the time of parking.

Meanwhile, the rotation of the shift spindle 101 causes the pivot of the gear shift arm 102 fitted to the shift spindle 101, which rotates the shift drum input gear 94 meshing with the gear shift arm 102 together with the shift drum 90. This causes the shift forks 82 and 83 to be guided by the guide grooves 91f and 91r, respectively, of the shift drum 90. Thus, the high-speed switching shifter member 46 and the low-speed/reverse switching shifter member 48 move and the shift stage is switched. The above-described parking state is set by the rotation of this shift spindle 101.

The shift actuation lever 100 fitted to the front end of the shift spindle 101 protruding forward is joined to the shift cable 121 extending from the parking operation lever 120 disposed in the operation panel 130 as described above, and the shift spindle 101 rotates through operation of the parking operation lever 120. Therefore, the setting of the parking state and the switching of the shift stage are carried out through the operation of the parking operation lever 120.

When the parking operation lever 120 enters the parking position, the sub-transmission Ts becomes the parking state and the rotation of the rear drive shaft 8 is restricted. Simultaneously, the differential lock mechanism added to the rear differential 9 operates to become the differential lock state, so that the differential is stopped. Thus, the left and right rear wheels 3 are fixed and a sure parking brake state is obtained.

The parking state by the parking operation lever 120 is described above. Gearshift operation other than the parking will be described below. FIGS. 4 and 7 show the state in which the shift stage is in the neutral state.

When the parking operation lever 120 is swung forward by one stage to be set to the reverse position, the shift spindle 101 rotates and the gear shift arm 102 swings to the right side, so that the shift drum 90 rotates through meshing between the gear shift arm 102 and the shift drum input gear 94. Referring to FIG. 7, this causes the low-speed/reverse switching shifter member 48 to move rearward and engage with the reverse clutch receiving member 50. Thus, the rotation of the gearshift drive shaft 41 is transmitted to the intermediate gear shaft 71 through meshing between the reverse drive gear 45 and the larger-diameter intermediate gear 72, and the rotation of the intermediate gear shaft 71 is transmitted to the gearshift driven shaft (output shaft) 51 through meshing between the smaller-diameter intermediate gear 73 and the low-speed driven gear 54. Thus, the rotation of the gearshift drive shaft 41 makes the rearward-traveling rotation of the gearshift driven shaft (output shaft) 51 due to the intermediary of the intermediate gear shaft 71, providing the reverse state.

When the parking operation lever 120 is swung further forward from this reverse state, the above-described parking state is obtained. On the other hand, when the parking operation lever 120 is swung rearward by one stage from the neutral state to be set to the high-speed advancement position, the shift cable 121 makes a push action and the shift spindle 101 rotates. Therefore, the gear shift arm 102 swings to the left side and the shift drum 90 rotates through meshing between the gear shift arm 102 and the shift drum input gear 94. Referring to FIG. 6, this causes the high-speed switching shifter member 46 to move rearward and engage with the high-speed gearshift clutch receiving member 47. Thus, the rotation of the gearshift drive shaft 41 is transmitted to the gearshift driven shaft (output shaft) 51 through meshing between the high-speed drive gear 43 and the high-speed driven gear 53, providing the high-speed advancement state.

When the parking operation lever 120 is swung further rearward from this high-speed advancement state to be set to the low-speed advancement state, the shift cable 121 further makes a push action and thereby the shift drum 90 further rotates. Referring to FIG. 6, this moves the high-speed switching shifter member 46 forward to release the engagement with the high-speed gearshift clutch receiving member 47, and causes the low-speed/reverse switching shifter member 48 to move forward and engage with the low-speed gearshift clutch receiving member 49. Thus, the rotation of the gearshift drive shaft 41 is transmitted to the gearshift driven shaft (output shaft) 51 through meshing between the low-speed drive gear 44 and the low-speed driven gear 54, providing the low-speed advancement state. The low-speed driven gear 54 is used for low-speed advancement and is also used for reverse traveling as described above. That is, the low-speed driven gear 54 is a transmission gear used for both forward and reverse traveling and the gearshift driven shaft 51 is also an output shaft used for both forward and reverse traveling.

In the sub-transmission Ts, the above-described shift stage switching is carried out through manual operation of the parking operation lever 120. In the high-speed advancement state, the vehicle is driven by two-wheel driving. In the low-speed advancement state and the reverse state, the vehicle is driven by four-wheel driving.

Figure 8:
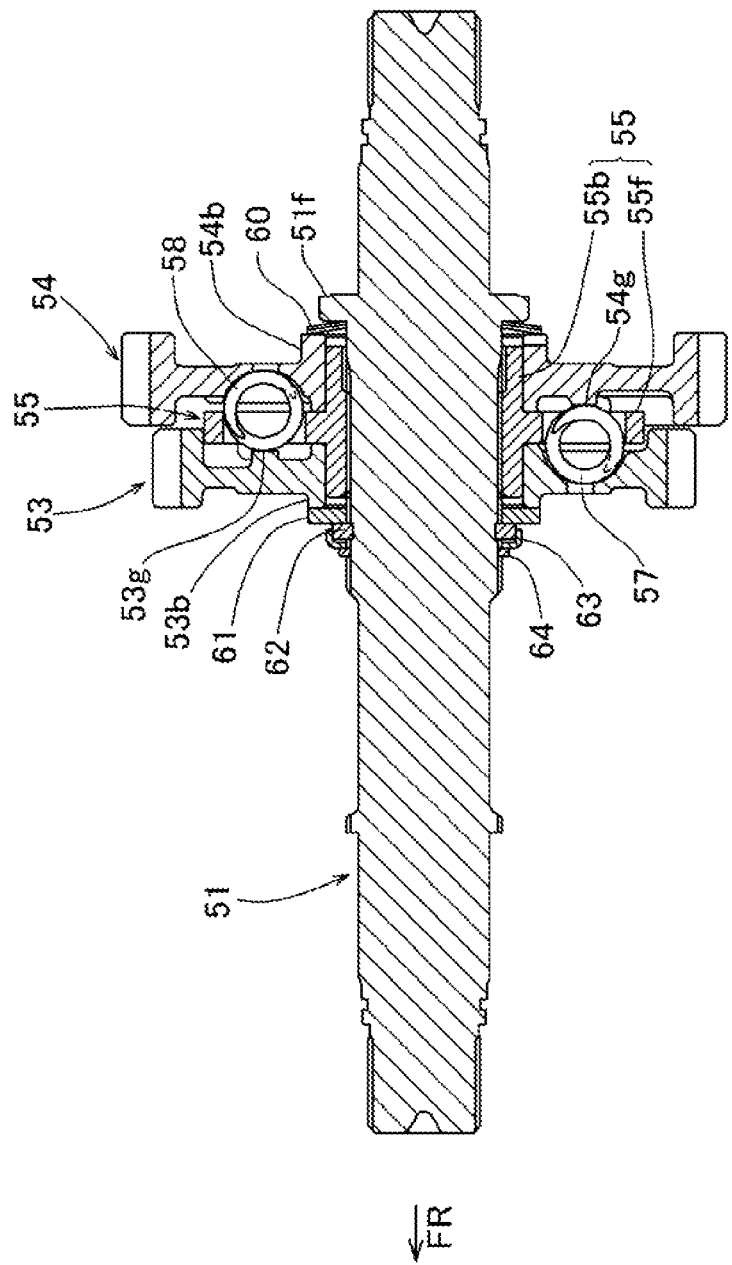
FIG. 8 is a sectional view of a state in which a high-speed driven gear, a low-speed driven gear, and so forth are assembled to a gearshift driven shaft of the power unit of FIG. 1.

A detailed description will be made below on the basis of FIGS. 8 to 14 about the torque dampers provided for the high-speed driven gear 53 and the low-speed driven gear 54 pivotally supported by the gearshift driven shaft 51 of the sub-transmission Ts as the output shaft of the power unit P. FIG. 8 is a sectional view of a state in which the high-speed driven gear 53 and the low-speed driven gear 54 are assembled to the gearshift driven shaft 51, and a sectional view of the disassembled state thereof is shown in FIG. 9.

Figure 9:
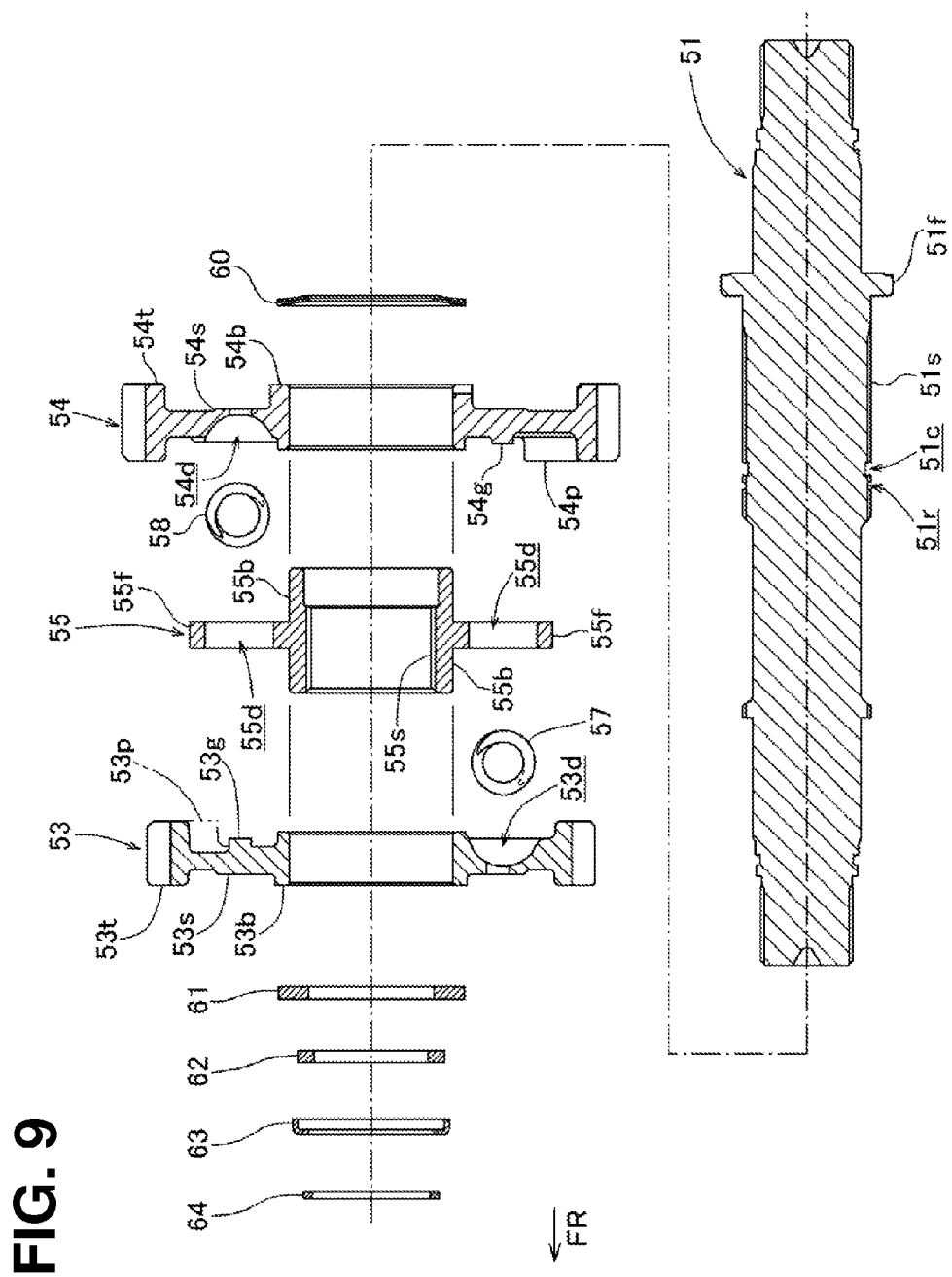
FIG. 9 is a sectional view of the state in FIG. 8 wherein the components are disassembled.

Referring to FIG. 9, the front and rear shaft ends of the gearshift driven shaft 51 are parts connected to the front drive shaft 6 and the rear drive shaft 8, respectively. In the gearshift driven shaft 51, a flange part 51*f* is formed closer to the rear shaft end than the center and a spline part 51*s* at which a spline is formed exists on the front side of the flange part 51*f*. At the front part of the spline part 51*s*, a cotter groove 51*c* and a ring groove 51*r* each having a ring shape in the circumferential direction are sequentially formed on the front side in the axial direction.

Figure 10:
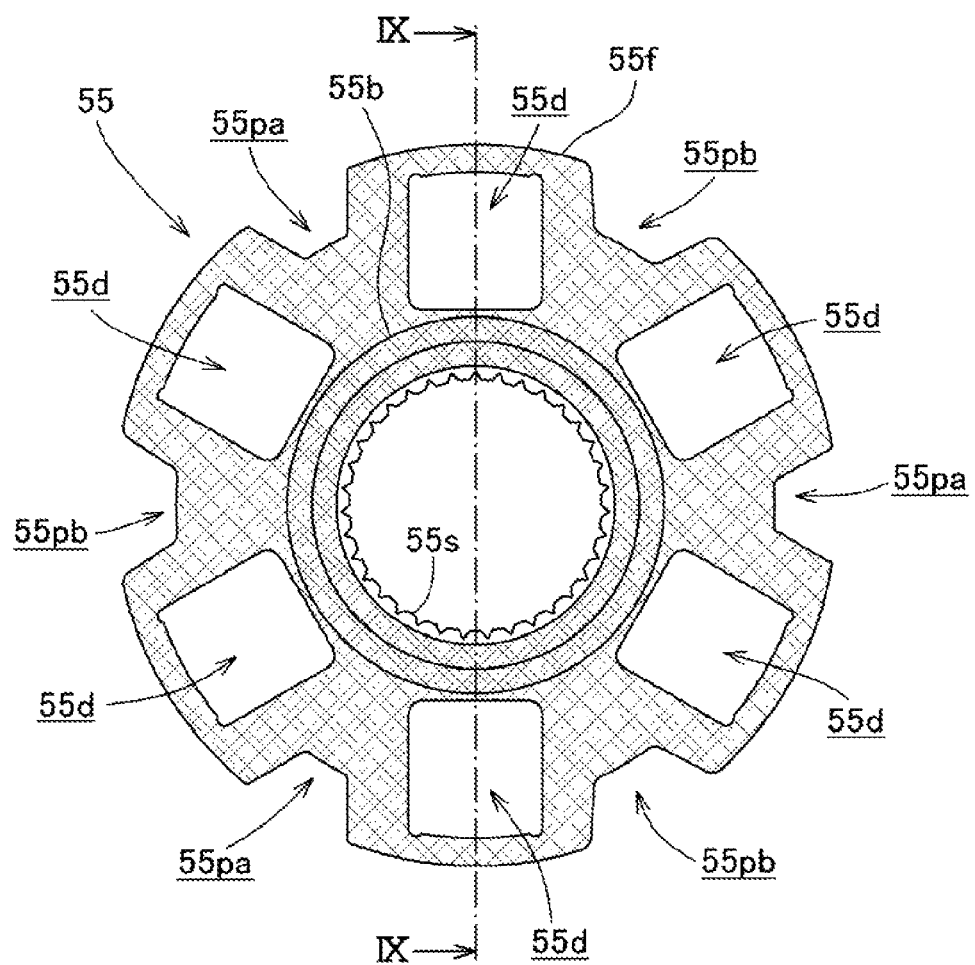
FIG. 10 is a rear view of a gear boss member of the power unit of FIG. 1.

Referring to FIGS. 9 and 10, the gear boss member 55, which pivotally supports the high-speed driven gear 53 and the low-speed driven gear 54, is composed of the cylindrical boss part 55*b* fitted to the gearshift driven shaft 51 and the circular flange part 55*f* formed at the center of the cylindrical boss part 55*b* in the axial direction as described above. In FIG. 10 (and FIGS. 13 and 14), the gear boss member 55 is shown by lattice-hatching.

In the inner circumferential surface of the cylindrical boss part 55*b*, a spline 55*s* fitted to the spline part 51*s* of the gearshift driven shaft 51 is formed. Six spring recesses 55*d* that hold the coil springs 57 and 58 each functioning as the torque damper are formed at equal intervals in the circumferential direction in the circular flange part 55*f*. The spring recesses 55*d* are through-holes that are formed as recesses having no bottom wall and penetrate the circular flange part 55*f* with a rectangular shape.

As shown in FIG. 10, at the outer circumferential rim of the circular flange part 55*f*, six relative rotation restricting recesses 55*pa* and 55*pb* are formed by notching at equal intervals in the circumferential direction in such a manner as to each cut into between the spring recesses 55*d* adjacent to each other. The relative rotation restricting recesses 55*pa* and 55*pb* include two kinds of recesses: the relative rotation restricting recesses 55*pa* having a smaller circumferential width and the relative rotation restricting recesses 55*pb* having a larger circumferential width. They are alternately formed in the circumferential direction.

Figure 11:
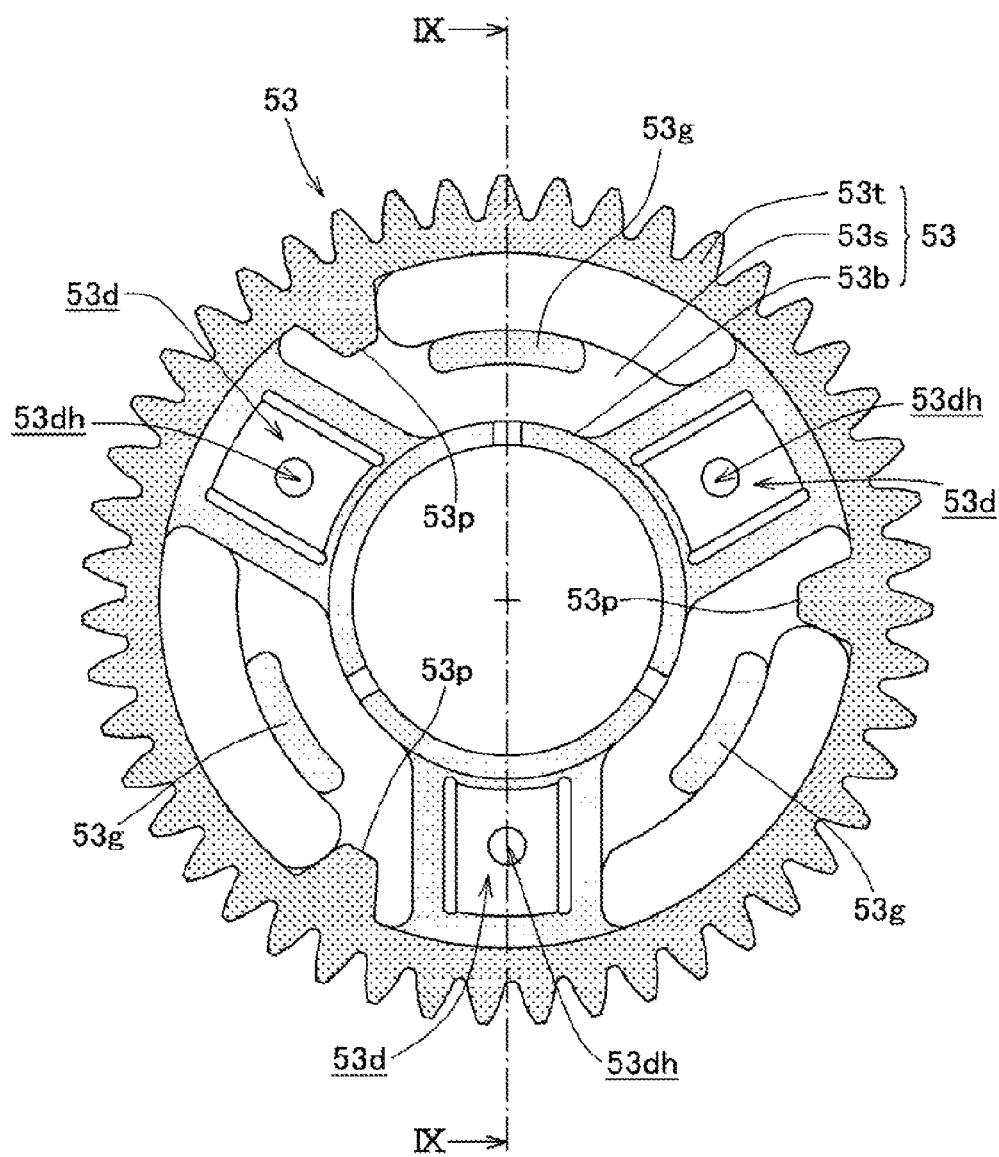
FIG. 11 is a rear view of the high-speed driven gear of the power unit of FIG. 1.

Referring to FIGS. 9 and 11, the high-speed driven gear 53 has a shape in which a spoke wall part 53*s* having a hollow circular plate shape links an inner circumferential boss part 53*b* at the inner circumferential end to an outer circumferential teeth part 53*t* at the outer circumferential end. The inner diameter of the inner circumferential boss part 53*b* is slightly larger than the outer diameter of the cylindrical boss part 55*b* of the gear boss member 55. The inner diameter of the inner circumferential circle of the outer circumferential teeth part 53*t* is slightly larger than the outer diameter of the circular flange part 55*f* of the gear boss member 55 (see FIG. 13).

As shown in FIG. 11, three spring recesses 53*d* that hold the high-speed-side coil springs 57 are formed at equal intervals in the circumferential direction in the spoke wall part 53*s* of the high-speed driven gear 53. The spring recess 53*d* is a recess formed to dent into a semicircular column shape in the rear surface of the spoke wall part 53*s*, and is opened into a rectangular shape toward the rear side. A circular hole 53*dh* is opened at the center of the bottom wall of each of the spring recesses 53*d*.

On the rear surface of the spoke wall part 53*s*, three relative rotation restricting projections 53*p* protruding in a tapered manner from the outer circumferential teeth part 53*t* toward the axial center are formed at equal intervals in the circumferential direction. The relative rotation restricting projection 53*p* has a trapezoidal shape in rear view and is formed at a biased position closer to a single side of the spring recess 53*d* (see FIG. 11). Furthermore, on the rear surface of the spoke wall part 53*s*, three guide parts 53*g* that are protruding streaks having a circular arc shape are formed at equal intervals in the circumferential direction in such a manner as to each exist between the two spring recesses 53*d* and on the concentric circle with respect to the circular holes 53*dh* (see FIG. 11).

Figure 12:
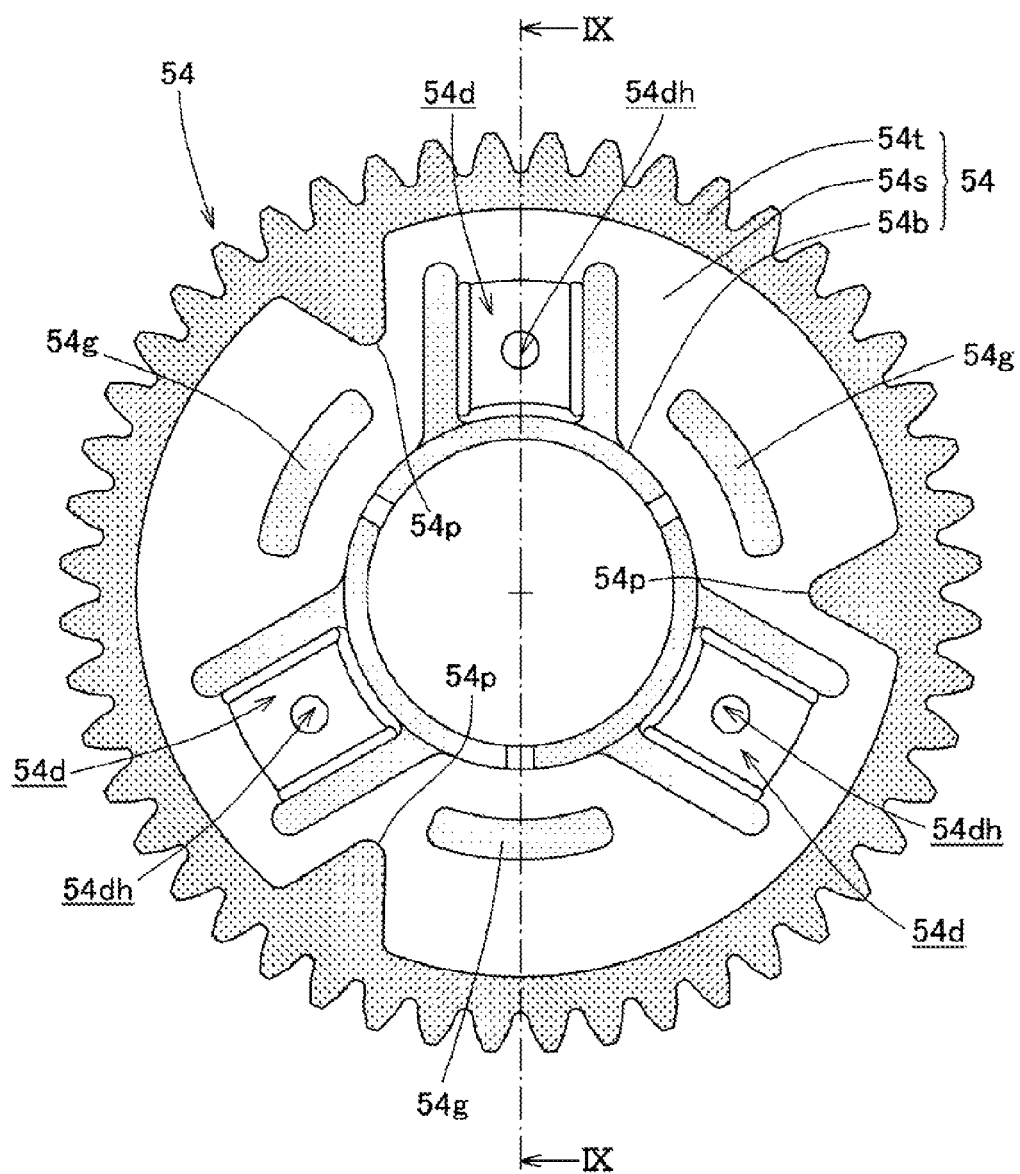
FIG. 12 is a front view of the low-speed driven gear of the power unit of FIG. 1.

Referring to FIGS. 9 and 12, the low-speed driven gear 54 has a shape in which a spoke wall part 54s having a hollow circular plate shape links an inner circumferential boss part 54b at the inner circumferential end to an outer circumferential teeth part 54t at the outer circumferential end. The inner diameter of the inner circumferential boss part 54b is slightly larger than the outer diameter of the cylindrical boss part 55b of the gear boss member 55. The inner diameter of the inner circumferential circle of the outer circumferential teeth part 54t is larger than the outer diameter of the circular flange part 55f of the gear boss member 55 (see FIG. 14). The outer circumferential teeth part 54t of the low-speed driven gear 54 has a larger outer diameter than the outer circumferential teeth part 53t of the high-speed driven gear 53 and also has a larger number of teeth.

As shown in FIG. 12, three spring recesses 54d that hold the low-speed-side coil springs 58 are formed at equal intervals in the circumferential direction in the spoke wall part 54s of the low-speed driven gear 54. The spring recess 54d is a recess formed to dent into a semicircular column shape in the front surface of the spoke wall part 54s, and is opened into a rectangular shape toward the front side. A circular hole 54dh is opened at the center of the bottom wall of each of the spring recesses 54d.

On the front surface of the spoke wall part 54s, three relative rotation restricting projections 54p protruding in a tapered manner from the outer circumferential teeth part 54t toward the axial center are formed at equal intervals in the circumferential direction. The relative rotation restricting projection 54p has a triangular shape in front view and is formed at a biased position closer to a single side of the spring recess 54d (see FIG. 12). Furthermore, on the front surface of the spoke wall part 54s, three guide parts 54g that are protruding streaks having a circular arc shape are formed at equal intervals in the circumferential direction in such a manner as to each exist between the two spring recesses 54d and on the concentric circle with respect to the circular holes 54dh (see FIG. 12).

Referring to FIG. 9, the front half parts of the high-speed-side coil springs 57 are each inserted into a respective one of the three spring recesses 53d of the spoke wall part 53s of the high-speed driven gear 53 and the inner circumferential boss part 53b is relatively rotatably fitted to the cylindrical boss part 55b of the gear boss member 55 from the front side. Furthermore, the rear half parts of the high-speed-side coil springs 57 are inserted into the spring recesses 55d of the gear boss member 55 and the cylindrical boss part 55b is fitted into the inner circumferential boss part 53b until the inner circumferential boss part 53b abuts against the circular flange part 55f of the gear boss member 55. Along with this, about half of the circular flange part 55f of the gear boss member 55 enters the inside of the inner circumferential circle of the outer circumferential teeth part 53t of the high-speed driven gear 53 and the spoke wall part 53s of the high-speed driven gear 53 is close to and opposed to the circular flange part 55f of the gear boss member 55.

Substantially simultaneously, the rear half parts of the low-speed-side coil springs 58 are each inserted into a respective one of the three spring recesses 54d of the spoke wall part 54s of the low-speed driven gear 54 and the inner circumferential boss part 54b is relatively rotatably fitted to the cylindrical boss part 55b of the gear boss member 55 from the rear side. Furthermore, the front half parts of the low-speed-side coil springs 58 are inserted into the spring recesses 55d of the gear boss member 55 and the cylindrical boss part 55b is fitted into the inner circumferential boss part 54b until the inner circumferential boss part 54b abuts against the circular flange part 55f of the gear boss member 55. Along with this, about half of the circular flange part 55f of the gear boss member 55 enters the inside of the inner circumferential circle of the outer circumferential teeth part 54t of the low-speed driven gear 54 and the spoke wall part 54s of the low-speed driven gear 54 is close to and opposed to the circular flange part 55f of the gear boss member 55.

Figure 13:
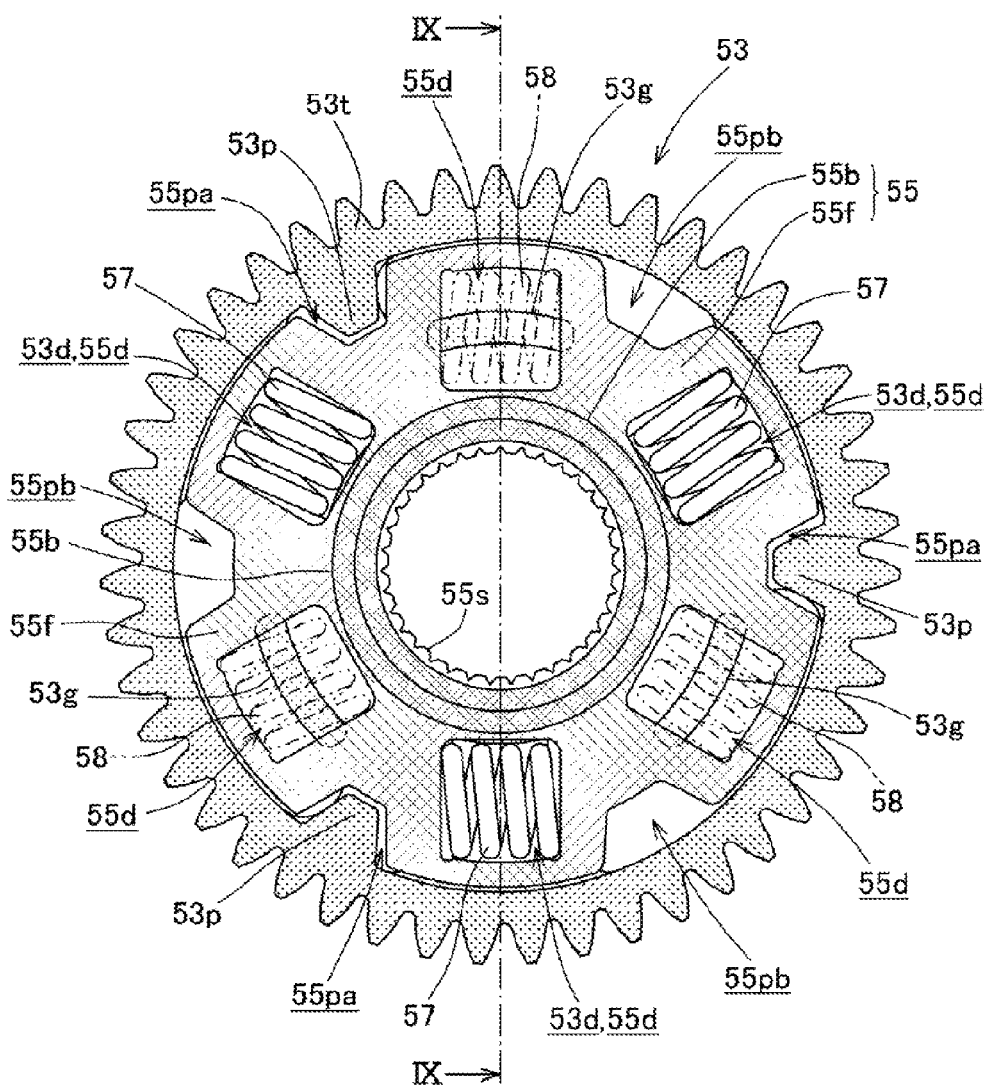
FIG. 13 is a rear view showing the assembled state of the gear boss member and the high-speed driven gear.

When the high-speed driven gear 53 and the low-speed driven gear 54 are assembled to the front and rear sides of the gear boss member 55 to form a subassembly in this manner, the high-speed-side coil springs 57 and the low-speed-side coil springs 58 are alternately disposed in the circumferential direction and the high-speed-side coil springs 57 are each interposed by being positioned by the guide part 54g of the low-speed driven gear 54 in such a manner as to straddle both the spring recess 55d of the gear boss member 55 and the spring recess 53d of the high-speed driven gear 53 (see FIGS. 8 and 13). As shown in the drawings, each of the coil springs 57, 58 has a central axis disposed substantially perpendicular to a central axis of the output shaft 51, which serves as a power transmission shaft. Furthermore, the low-speed-side coil springs 58 are each interposed by being positioned by the guide part 53g of the high-speed driven gear 53 in such a manner as to straddle both the spring recess 55d of the gear boss member 55 and the spring recess 54d of the low-speed driven gear 54 (see FIGS. 8 and 14).

Referring to FIG. 8, the high-speed-side coil spring 57 straddling both the gear boss member 55 and the high-speed driven gear 53 is positioned by pressing of the part exposed rearward from the spring recess 55d of the gear boss member 55 by the guide part 54g of the low-speed driven gear 54. Furthermore, the low-speed-side coil spring 58 straddling both the gear boss member 55 and the low-speed driven gear 54 is positioned by pressing of the part exposed forward from the spring recess 55d of the gear boss member 55 by the guide part 53g of the high-speed driven gear 53. Thus, the high-speed-side coil spring 57 and the low-speed-side coil spring 58 are disposed at such positions that substantially half bodies of them overlap with each other in the axial direction.

FIG. 13 is a rear view obtained when the sub-assembled state in which the high-speed driven gear 53 and the low-speed driven gear 54 are assembled to the front and rear sides of the gear boss member 55 is viewed from the rear side, with the low-speed driven gear 54 omitted. The relative rotation restricting projections 53p of the high-speed driven gear 53 are loosely fitted into the relative rotation restricting recesses 55pa having a smaller circumferential width of the relative rotation restricting recesses 55pa and 55pb formed at the outer circumferential rim of the circular flange part 55f of the gear boss member 55. This forms a relative rotation restricting mechanism that restricts relative rotation between the gear boss member 55 and the high-speed driven gear 53.

Figure 14:
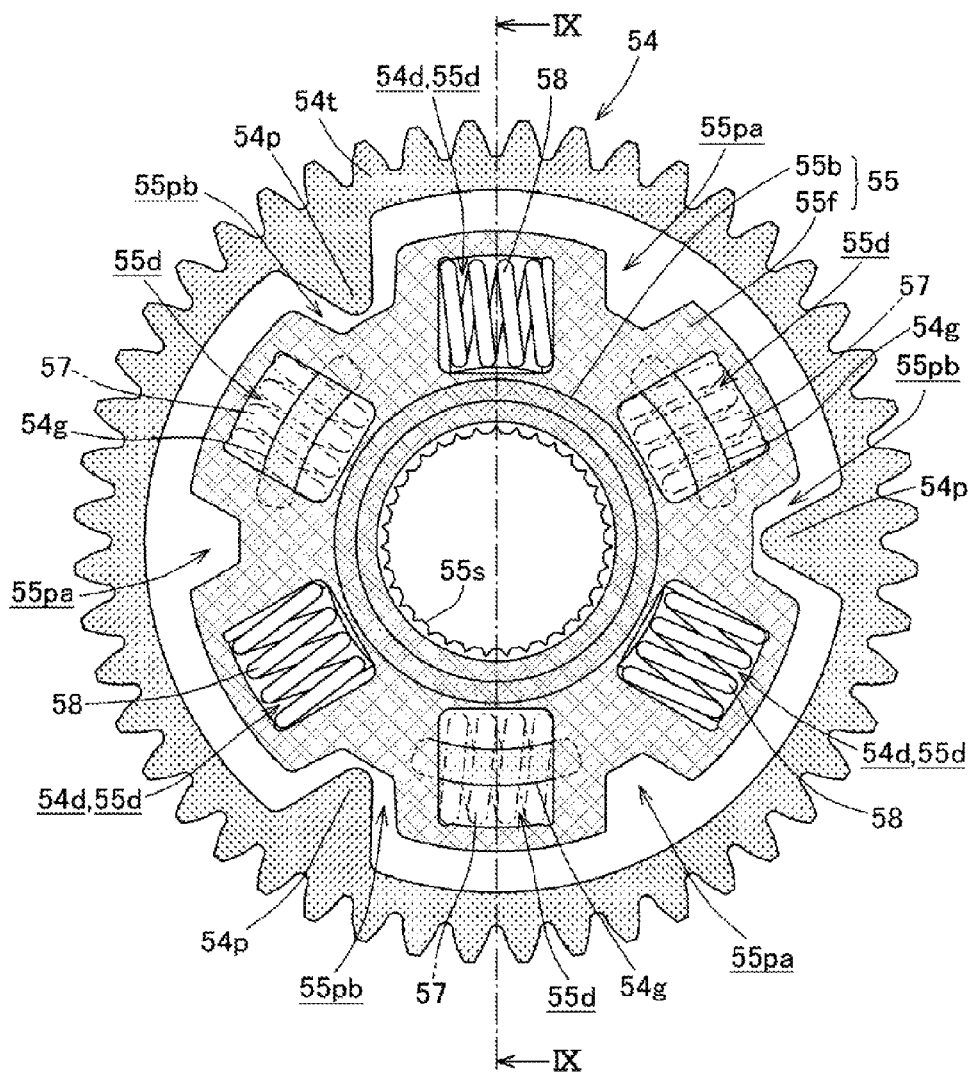
FIG. 14 is a front view showing the assembled state of the gear boss member and the low-speed driven gear.

FIG. 14 is a front view obtained when the sub-assembled state in which the high-speed driven gear 53 and the low-speed driven gear 54 are assembled to the front and rear sides of the gear boss member 55 is viewed from the front side, with the high-speed driven gear 53 omitted. The relative rotation restricting projections 54p of the low-speed driven gear 54 are loosely fitted into the relative rotation restricting recesses 55pb having a larger circumferential width of the relative rotation restricting recesses 55pa and 55pb formed at the outer circumferential rim of the circular flange part 55f of the gear boss member 55. This forms a relative rotation restricting mechanism that restricts relative rotation between the gear boss member 55 and the low-speed driven gear 54.

Referring to FIGS. 13 and 14, in the relative rotation restricting mechanism between the gear boss member 55 and the high-speed driven gear 53, the relative rotation restricting projections 53$p$ having a larger circumferential width are loosely fitted into the relative rotation restricting recesses 55$pa$ having a smaller circumferential width and the predetermined range of the relative rotation restricted is smaller. In contrast, in the relative rotation restricting mechanism between the gear boss member 55 and the low-speed driven gear 54, the relative rotation restricting projections 54$p$ having a smaller circumferential width are loosely fitted into the relative rotation restricting recesses 55$pb$ having a larger circumferential width and the predetermined range of the relative rotation restricted is larger.

The procedure of attaching the high-speed driven gear 53 and the low-speed driven gear 54 in the sub-assembled state as above to the gearshift driven shaft 51 is as follows. Specifically, referring to FIG. 9, first the coned disc spring 60 is fitted to the gearshift driven shaft 51 from the front side and is made to abut against the flange part 51$f$ of the gearshift driven shaft 51. Thereafter, the gear boss member 55 pivotally supporting the high-speed driven gear 53 and the low-speed driven gear 54 in the sub-assembled state on the front and rear sides is fitted to the gearshift driven shaft 51 and the spline 55$s$ in the inner circumferential surface of the cylindrical boss part 55$b$ of the gear boss member 55 is splined to the spline part 51$s$ of the gearshift driven shaft 51.

In the high-speed driven gear 53 and the low-speed driven gear 54 pivotally supported by the cylindrical boss part 55$b$ on the front and rear sides of the gear boss member 55, the inner circumferential boss part 53$b$ and the inner circumferential boss part 54$b$ sandwich the circular flange part 55$f$ of the gear boss member 55 from the front and rear sides and slightly protrude from the cylindrical boss part 55$b$ of the gear boss member 55 to the front and rear sides, respectively. The coned disc spring 60 is interposed between the flange part 51$f$ of the gearshift driven shaft 51 and the inner circumferential boss part 54$b$ of the low-speed driven gear 54 pivotally supported by the gear boss member 55.

Next, a retaining metal component 61 having a circular ring shape is fitted to the gearshift driven shaft 51 from the front side. Along with this, the retaining metal component 61 abuts against the inner circumferential boss part 53$b$ of the high-speed driven gear 53 pivotally supported by the gear boss member 55. Subsequently, a pair of cotters 62 that are made as half-split parts and have a semicircular arc shape are made to abut against the retaining metal component 61 and are fitted into the cotter groove 51$c$ of the gearshift driven shaft 51 to position the retaining metal component 61.

The pair of cotters 62 fitted to the cotter groove 51$c$ are held by a cotter holding metal component 63 that is fitted to the gearshift driven shaft 51 from the front side and has a circular ring shape, with the outer circumferential surface and one side surface (front surface) of the cotters 62 covered. Finally, a retaining ring 64 is made to abut against the cotter holding metal component 63 and is fitted into the ring groove 51$r$ of the gearshift driven shaft 51 to be used as a component for preventing the removal of the cotter holding metal component 63.

In this manner, the high-speed driven gear 53 and the low-speed driven gear 54 are attached to the gearshift driven shaft 51 as shown in FIG. 8. The high-speed driven gear 53 and the low-speed driven gear 54 are interposed between the flange part 51$f$ of the gearshift driven shaft 51 and the retaining metal component 61 positioned by the cotters 62 and are biased by the coned disc spring 60 to be pressed against the retaining metal component 61 on the front side.

As above, the high-speed driven gear 53 and the low-speed driven gear 54 are assembled to the gearshift driven shaft 51. Therefore, the rotation of the high-speed drive gear 43 pivotally supported by the gearshift drive shaft 41 is transmitted to the high-speed driven gear 53 meshing with the high-speed drive gear 43 and then is transmitted to the gearshift driven shaft 51 via the torque damper of the high-speed-side coil springs 57. The rotation of the low-speed drive gear 44 or the smaller-diameter intermediate gear 73 of the intermediate gear shaft 71 is transmitted to the low-speed driven gear 54 meshing with them and then is transmitted to the gearshift driven shaft 51 via the torque damper of the low-speed-side coil springs 58.

In the sub-transmission Ts, the high-speed-side coil springs 57 and the low-speed-side coil springs 58 are provided between the gear boss member 55 (and the gearshift driven shaft 51) and the high-speed driven gear 53 and the low-speed driven gear 54, respectively, as one gear of the pair of transmission drive gear 43 and 44 and transmission driven gear 53 and 54 meshing with each other. Thus, the high-speed driven gear 53 and the low-speed driven gear 54 are formed of separate bodies divided by the high-speed-side coil springs 57 and the low-speed-side coil springs 58, respectively. Therefore, the inertia mass of the whole transmission becomes smaller and torque fluctuation itself accompanying driving reaction force and gearshift can be suppressed to small fluctuation. Furthermore, the vibration of the power unit P can be easily reduced.

Furthermore, the high-speed-side coil springs 57 and the low-speed-side coil springs 58 absorb torque fluctuation and exert a vibration isolation effect against excess counter torque from the front wheels 2 and the rear wheels 3 at the downstream ends of the power transmission.

The high-speed driven gear 53 and the low-speed driven gear 54 sandwich the gear boss member 55 between them and receive a biasing force by the coned disc spring 60 to be pressed against the retaining metal component 61. Thus, they function as a torque damper with a certain level of frictional resistance at the time of initial rotation accompanying torque fluctuation. This can complement the initial vibration isolation effect of each of the high-speed-side coil springs 57 and the low-speed-side coil springs 58.

The high-speed-side coil springs 57 and the low-speed-side coil springs 58 are provided between the high-speed driven gear 53 and the gearshift driven shaft 51 and between the low-speed driven gear 54 and the gearshift driven shaft 51 and do not need to be provided on the input side and output side of the sub-transmission Ts. This can reduce the size of the power unit P.

The shaft part side of the high-speed driven gear 53 and the low-speed driven gear 54 separated by the high-speed-side coil springs 57 and the low-speed-side coil springs 58 is the gear boss member 55 used in common. Thus, the number of components can be reduced and the high-speed driven gear 53 and the low-speed driven gear 54 can be compactly assembled to the one gear boss member 55, which can achieve size reduction of the sub-transmission Ts and the power unit P.

The high-speed-side coil springs 57 are interposed to straddle both the spring recesses 55$d$ and 53$d$ formed, with openings opposed to each other, in both of the surfaces opposed to each other in the high-speed driven gear 53 and the circular flange part 55$f$ of the gear boss member 55. Furthermore, the low-speed-side coil springs 58 are interposed to straddle both the spring recesses 55d and 54d formed, with openings opposed to each other, in both of the surfaces opposed to each other in the low-speed driven gear 54 and the circular flange part 55f of the gear boss member 55. Therefore, a dedicated member that positions and holds the high-speed-side coil springs 57 and the low-speed-side coil springs 58 is unnecessary and the high-speed-side coil springs 57 and the low-speed-side coil springs 58 can be compactly disposed, which can achieve size reduction and simplification of the sub-transmission Ts.

The high-speed-side coil spring 57 and the low-speed-side coil spring 58 are each disposed in plurality at equal intervals in the circumferential direction in the circular flange part 55f of the gear boss member 55. Thus, the spring load in the circumferential direction involves no bias and uniformly works and it is possible to reduce the pressing frictional force in the radial direction between the gear boss member 55 and the high-speed-side springs 57 and between the gear boss member 55 and the low-speed-side springs 58.

Furthermore, the high-speed-side coil springs 57 and the low-speed-side coil springs 58 are alternately disposed in the circumferential direction and are disposed at such positions as to partly overlap with each other in the axial direction. Therefore, the high-speed driven gear 53 and the low-speed driven gear 54 disposed on the front and rear sides of the circular flange part 55f of the gear boss member 55 with the intermediary of the high-speed-side coil springs 57 and the low-speed-side coil springs 58, respectively, can be disposed closer to each other. This can suppress the width of the sub-transmission Ts in the axial direction to a small width, which can further reduce the sizes of the sub-transmission Ts and power unit P.

The high-speed-side coil springs 57 are each held astride the spring recess 53d of the high-speed driven gear 53 and the spring recess 55d, which is the through-hole in the gear boss member 55, and are each positioned by the guide part 54g of the low-speed driven gear 54. The low-speed-side coil springs 58 are each held astride the spring recess 54d of the low-speed driven gear 54 and the spring recess 55d, which is the through-hole in the gear boss member 55, and are each positioned by the guide part 53g of the high-speed driven gear 53. Therefore, the high-speed-side coil springs 57 and the low-speed-side coil springs 58 are disposed at such positions that substantially half bodies of them overlap with each other in the axial direction and the high-speed driven gear 53 and the low-speed driven gear 54 can be brought closer to each other. This can further suppress the width of the sub-transmission Ts in the axial direction to a smaller width, which can further reduce the sizes of the sub-transmission Ts and the power unit P.

The spring recesses 55d are formed at equal intervals in the circumferential direction in the circular flange part 55f of the gear boss member 55 and the relative rotation restricting mechanisms that restrict relative rotation between the gear boss member 55 and each of the high-speed driven gear 53 and the low-speed driven gear 54 in the predetermined ranges are formed between the spring recesses 55d adjacent to each other. Thus, the relative rotation restricting mechanisms can be formed substantially on a circle concentric with the circle on which the spring recesses 55d are disposed, and the functions can be aggregated on the axial center side, which can achieve further size reduction of the sub-transmission Ts.

Into the relative rotation restricting recesses 55pa and 55pb made by notching at the outer circumferential rim of the circular flange part 55f of the gear boss member 55, the relative rotation restricting projections 53p and 54p protruding from the high-speed driven gear 53 and the low-speed driven gear 54 toward the respective relative rotation restricting recesses 55pa and 55pb are fitted. Therefore, the relative rotation restricting mechanisms are formed. Therefore, a simple, compact relative rotation restricting structure is obtained and processing molding of the gear boss member 55, the high-speed driven gear 53, and the low-speed driven gear 54 is also easy, which can achieve improvement in manufacturing productivity.

The predetermined range of the relative rotation restricted is smaller in the relative rotation restricting mechanism between the high-speed driven gear 53 having lower transmission torque and the gear boss member 55 than in the relative rotation restricting mechanism between the low-speed driven gear 54 having higher transmission torque and the gear boss member 55. Thus, by restricting the relative rotation accompanying rotation fluctuation of the high-speed driven gear 53, which has the lower transmission torque and rotates at higher speed, in the smaller range, the amount of relative rotation at high speed can be reduced and shock can be suppressed as much as possible.

The gearshift driven shaft 51 pivotally supporting the high-speed driven gear 53 and the low-speed driven gear 54 is the output shaft 51 of the power unit P used for both forward and reverse traveling. Thus, it is possible to compactly form the structure in which the high-speed-side coil springs 57 and the low-speed-side coil springs 58 are incorporated into the high-speed driven gear 53 and the low-speed driven gear 54 provided on the final output shaft 51, which is a junction part of the driving force for forward traveling and the driving force for reverse traveling to the drive wheels, and suppress the extension of the structure around the final output shaft 51 of the power unit P.

The drive torque damper structure of a power unit in one exemplary embodiment according to the present invention is described above. However, modes of the present invention are not limited to the above embodiment and include other embodiments and modifications carried out with a variety of modes within the scope of the gist of the present invention.

For example, in the present embodiment, the six spring recesses 55d formed in the circular flange part 55f of the gear boss member 55 are made as through-holes that are formed as recesses having no bottom wall and penetrate the circular flange part 55f with a rectangular shape. However, at least part of the bottom walls of the recesses may be left intact. Such a configuration eliminates the need for the guide parts 54g and 53g to position the coil springs 57 and 58. The bottom walls of the spring recesses 55d substitute for the guide parts 54g and 53g and the coil springs 57 and 58 can be positioned and held at the predetermined positions.

DESCRIPTION OF REFERENCE SYMBOLS

P . . . Power unit, E . . . Internal combustion engine, Tm . . . Main transmission, Ts . . . Sub-transmission,
1 . . . Rough-terrain vehicle, 31 . . . Main shaft, 32 . . . Countershaft,
41 . . . Gearshift drive shaft, 43 . . . High-speed drive gear, 44 . . . Low-speed drive gear, 45 . . . Reverse drive gear,
51 . . . Gearshift driven shaft (output shaft)
53 . . . High-speed driven gear, 53t . . . Outer circumferential teeth part, 53s . . . Spoke wall part, 53b . . . Inner circumferential boss part, 53d . . . Spring recess, 53g . . . Guide part, 53p . . . Relative rotation restricting projection,
54 . . . Low-speed driven gear, 54t . . . Outer circumferential teeth part, 54s . . . Spoke wall part, 54b . . . Inner circumferential boss part, 54*d* . . . Spring recess, 54*g* . . . Guide part, 54*p* . . . Relative rotation restricting projection,

55 . . . Gear boss member, 55*b* . . . Cylindrical boss part, 55*f* . . . Circular flange part, 55*s* . . . Spline, 55*d* . . . Spring recess, 55*pa*, 55*pb* . . . Relative rotation restricting recess,

57 . . . High-speed-side coil spring, 58 . . . Low-speed-side coil spring,

60 . . . Coned disc spring, 61 . . . Retaining metal component, 62 . . . Cotter, 63 . . . Cotter holding metal component, 64 . . . Retaining ring,

200 . . . Joining torque damper, 201 . . . Drive-side damper half body, 201*d* . . . Drive-side spring recess, 202 . . . Driven-side damper half body, 202*d* . . . Driven-side spring recess, 203 . . . Coil spring.

The invention claimed is:

1. A vibration isolation structure of a power unit including an internal combustion engine and transmissions, of which one said transmission has a plurality of transmission gears and a power transmission shaft that pivotally supports the plurality of transmission gears, the vibration isolation structure comprising: torque dampers provided between a pair of transmission gears adjacent to each other and the power transmission shaft in the one transmission,
wherein at least one of the torque dampers comprises a plurality of coil springs each having a central axis disposed substantially perpendicular to a central axis of the power transmission shaft.

2. The vibration isolation structure of a power unit according to claim 1, wherein the transmissions include a main transmission and a sub-transmission, and the plurality of transmission gears and the power transmission shaft are in the sub-transmission.

3. A vibration isolation structure of a power unit including an internal combustion engine and transmissions, of which one said transmission has a plurality of transmission gears and a power transmission shaft that pivotally supports the plurality of transmission gears, the vibration isolation structure comprising:
torque dampers provided between a pair of transmission gears adjacent to each other and the power transmission shaft in the one transmission, and a gear boss member non-rotatably fitted to the power transmission shaft,
wherein the adjacent transmission gears are pivotally supported by the gear boss member relatively rotatably, one of the torque dampers is provided between one of the adjacent transmission gears and the gear boss member, and another of the torque dampers is provided between the other of the adjacent transmission gears and the gear boss member.

4. The vibration isolation structure of a power unit according to claim 3, wherein the gear boss member is composed of a cylindrical boss part non-rotatably fitted to the power transmission shaft and a circular flange part formed at center of the cylindrical boss part in an axial direction thereof,
the adjacent transmission gears are disposed on opposite sides of the circular flange part of the gear boss member with the circular flange part therebetween, and are pivotally supported by the cylindrical boss part relatively rotatably,
the one torque damper includes a first-side coil spring which is interposed such that the first-side coil spring straddles two spring recesses respectively formed, with openings opposed to each other, in opposed surfaces of the one adjacent transmission gear and the circular flange part of the gear boss member, and the other torque damper includes a second-side coil spring which is interposed such that the second-side coil spring straddles two other spring recesses respectively formed, with openings opposed to each other, in opposed surfaces of the other adjacent transmission gear and the circular flange part of the gear boss member.

5. The vibration isolation structure of a power unit according to claim 4, wherein
the vibration isolation structure includes more than one said first-side coil spring and more than one said second-side coil spring which are disposed at equal intervals from each other in a circumferential direction of the circular flange part of the gear boss member,
the first-side coil springs and the second-side coil springs are alternately disposed in the circumferential direction of the circular flange part,
and the first-side coil springs and the second-side coil springs are disposed so as to partly overlap with each other in the axial direction of the cylindrical boss part.

6. The vibration isolation structure of a power unit according to claim 5, wherein the spring recesses are formed at equal intervals in the circumferential direction in the circular flange part of the gear boss member, and relative rotation restricting mechanisms that restrict relative rotation between the gear boss member and each of the adjacent transmission gears in predetermined ranges are formed between adjacent ones of the spring recesses.

7. The vibration isolation structure of a power unit according to claim 6, wherein the relative rotation restricting mechanisms are formed substantially concentrically with a circular portion of the circular flange part along which the spring recesses are formed.

8. The vibration isolation structure of a power unit according to claim 6, wherein the relative rotation restricting mechanisms includes loosely fitting relative rotation restricting projections protruding from both of the adjacent transmission gears toward and into the relative rotation restricting recesses notched into an outer circumferential rim of the circular flange part of the gear boss member.

9. The vibration isolation structure of a power unit according to claim 5, wherein the spring recesses formed in the circular flange part of the gear boss member are throughholes that fully penetrate the circular flange part, guide parts that position the first-side coil springs are formed in the other of the adjacent transmission gears and opposed to the spring recesses of the one of the adjacent transmission gears, and guide parts that position the second-side coil springs are formed in the one of the adjacent transmission gears and opposed to the spring recesses of the other of the adjacent transmission gears.

10. The vibration isolation structure of a power unit according to claim 9, wherein the spring recesses are formed at equal intervals in the circumferential direction in the circular flange part of the gear boss member, and relative rotation restricting mechanisms that restrict relative rotation between the gear boss member and each of the adjacent transmission gears in predetermined ranges are formed between adjacent ones of the spring recesses.

11. The vibration isolation structure of a power unit according to claim 10, wherein the relative rotation restricting mechanisms are formed substantially concentrically with a circular portion of the circular flange part along which the spring recesses are formed.

12. The vibration isolation structure of a power unit according to claim 10, wherein the relative rotation restricting mechanisms includes loosely fitting relative rotation restricting projections protruding from both of the adjacent transmission gears toward and into the relative rotation restricting recesses notched into an outer circumferential rim of the circular flange part of the gear boss member.

13. The vibration isolation structure of a power unit according to claim 12, wherein the one of the adjacent transmission gears has a lower transmission torque and the other of the adjacent transmission gears has a higher transmission torque, and the predetermined range of the relative rotation of the relative rotation restricting mechanism between the one of the adjacent transmission gears and the gear boss member is smaller than the predetermined range of the relative rotation restricting mechanism between the other of the adjacent transmission gears and the gear boss member.

14. The vibration isolation structure of a power unit according to claim 6, wherein the one of the adjacent transmission gears has a lower transmission torque and the other of the adjacent transmission gears has a higher transmission torque, and the predetermined range of the relative rotation of the relative rotation restricting mechanism between the one of the adjacent transmission gears and the gear boss member is smaller than the predetermined range of the relative rotation restricting mechanism between the other of the adjacent transmission gears and the gear boss member.

15. The vibration isolation structure of a power unit according to claim 14, wherein the power transmission shaft pivotally supporting the plurality of transmission gears is an output shaft of the power unit used for both forward and reverse traveling.

16. The vibration isolation structure of a power unit according to claim 13, wherein the power transmission shaft pivotally supporting the plurality of transmission gears is an output shaft of the power unit used for both forward and reverse traveling.

* * * * *